(12) United States Patent
Liu et al.

(10) Patent No.: US 12,269,227 B1
(45) Date of Patent: Apr. 8, 2025

(54) SKIN MANUFACTURING POST-TREATMENT DEVICE FOR AUTOMOBILE COLLISION DUMMY

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

(72) Inventors: Zhixin Liu, Tianjin (CN); Haitao Zhu, Tianjin (CN); Tianyi Hao, Tianjin (CN); Yongqiang Wu, Tianjin (CN); Weidong Liu, Tianjin (CN); Kai Wang, Tianjin (CN); Hanxiao Zhang, Tianjin (CN); Weinan Ju, Tianjin (CN); Shuo Zhao, Tianjin (CN); Bosong Liu, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/812,346

(22) Filed: Aug. 22, 2024

(30) Foreign Application Priority Data

Jan. 10, 2024 (CN) .......................... 202410032381.5

(51) Int. Cl.
*B29C 73/02* (2006.01)
*B29C 73/26* (2006.01)
(Continued)

(52) U.S. Cl.
CPC .............. *B29C 73/02* (2013.01); *B29C 73/26* (2013.01); *B29C 73/34* (2013.01); *B29C 2073/264* (2013.01); *B29L 2031/702* (2013.01)

(58) Field of Classification Search
CPC . B29L 2031/702; B29C 2073/264; B64F 5/40
See application file for complete search history.

(56) References Cited

U.S. PATENT DOCUMENTS

2021/0302937 A1* 9/2021 Ridgeway .......... G05B 19/4099

FOREIGN PATENT DOCUMENTS

| CN | 105922086 A | * | 9/2016 | ......... B24B 27/0023 |
| CN | 208409034 U | * | 1/2019 | |

(Continued)

OTHER PUBLICATIONS

Machine translation CN105922086A (Year: 2016).*
(Continued)

*Primary Examiner* — Jacob T Minskey
*Assistant Examiner* — Wayne K. Swier
(74) *Attorney, Agent, or Firm* — Westbridge IP LLC

(57) ABSTRACT

A skin manufacturing post-treatment device for an automobile collision dummy device includes a post-treatment mechanism, where the post-treatment mechanism includes a rotary operation table that is provided with a cutting station, a grinding station, a skin patching station and a removal station in a circumferential direction; the cutting station is configured to cut an injection molding residual material on a surface of a dummy skin, and the grinding station is configured to grind a cut position to form a frustum-shaped patching recess; and the skin patching station is configured to fill the patching recess with a welding skin patching material, and the removal station is configured to clean a skin patching position.

10 Claims, 19 Drawing Sheets

(51) Int. Cl.
   *B29C 73/34*    (2006.01)
   *B29L 31/00*    (2006.01)

(56) References Cited

FOREIGN PATENT DOCUMENTS

| | | | |
|---|---|---|---|
| CN | 111958331 A | | 11/2020 |
| CN | 113734462 A | | 12/2021 |
| CN | 114193696 A | | 3/2022 |
| CN | 217393935 U | * | 9/2022 |
| CN | 217572837 U | * | 10/2022 |
| CN | 117301582 A | * | 12/2023 |
| JP | 6663255 B2 | * | 3/2020 ............. B24B 17/02 |

OTHER PUBLICATIONS

Machine translation CN208409034U (Year: 2019).*
Machine translation JP6663255B2 (Year: 2020).*
Machine translation CN111958331A (Year: 2020).*
Machine translation CN113734462A (Year: 2021).*
Machine translation CN217572837U (Year: 2022).*
Machine translation CN217393935U (Year: 2022).*
Machine translation CN114193696A (Year: 2022).*
Machine translation CN117301582A (Year: 2023).*
Notification to Grant Patent Right for Invention issued in counterpart Chinese Patent Application No. 202410032381.5, dated Feb. 20, 2024.

* cited by examiner

SKIN MANUFACTURING POST-TREATMENT DEVICE FOR AUTOMOBILE COLLISION DUMMY

CROSS-REFERENCE TO RELATED APPLICATIONS

This application claims priority to Chinese Patent Application No. 202410032381.5, filed on Jan. 10, 2024, the content of which is incorporated herein by reference in its entirety.

TECHNICAL FIELD

The disclosure relates to the technical field of automobile dummy skins, in particular to a skin manufacturing post-treatment device for an automobile collision dummy.

BACKGROUND

With the growth of automobile parc and popularity of smart driving assistance systems, automobile safety gets increasing attention. Damage data collected in a collision test of a collision dummy can be used for effectively testing safety of the automobile. As an outermost structure of the collision dummy, dummy skin is required to be aesthetic, and be capable of protecting an internal muscle layer and acting as a high-precision sensor with consideration of structural parameters and bionic mechanical properties of tests. During an automobile collision test, chest skin suffers from multiple stresses including violent pulling by a seat belt, impact by an air bag as well as an expansion tensile stress resulted from rib deformation of the dummy upon collision. In view of this, the chest skin of the dummy should be free of damage extending to the muscle layer since such damage results in stress concentration and reduction in durability and aesthetics of the skin.

The chest skin of the dummy is injection molded by sequentially pouring materials of the muscle layer and a skin layer into a mold. Such an injection molding process is likely to form at least two pouring channels that are in communication with the muscle layer in the chest skin of the dummy after demoulding. The pouring channel is sandwiched between an internal muscle layer and an external skin layer and forms a gate after being cut off. The gate requires to be patched due to its great diameter and severe influence of its portion near a central axis of the back of the chest skin on an overall strength of the chest skin and sewing firmness of a zipper. In the prior art, cutting of the pouring channel and patching of the gate after cutting are usually performed manually. Specifically, surplus materials of the gate are removed before the surface of the gate is covered with a patching material that is cut to have a diameter similar to that of the gate, and the patching material is combined with the gate by ironing the gate constantly with an soldering iron after a gap between the patching material and the gate is filled with particles same as the material of the breast skin. The filling efficiency is low since the filling method is performed manually throughout.

SUMMARY

An objective of the disclosure is to provide a skin manufacturing post-treatment device for an automobile collision dummy for solving the problems above. The device includes:

a base, where the base has a mounting surface;

an adjustment mechanism, where the adjustment mechanism is mounted on the mounting surface and has a mounting position for a dummy skin to be mounted, and a spatial position of the mounting position is adjustable; and the dummy skin is made through an injection molding process; and a post-treatment mechanism, where post-treatment mechanism is mounted on the mounting surface and located at a side of the adjustment mechanism, and the post-treatment mechanism includes a rotary operation table; a cutting station, a grinding station, a skin patching station and a removal station are sequentially arranged on the rotary operation table in a circumferential direction, and the rotary operation table is configured to place the stations over the mounting position in turn; the cutting station is configured to cut an injection molding residual material on a surface of the dummy skin, the grinding station is configured to grind a cut position to form a frustum-shaped patching recess, and an opening end of the patching recess is a large-diameter end; and the skin patching station is configured to fill the patching recess with a welding skin patching material, and the removal station is configured to clean a skin patching position; where the skin patching station includes: a first support plate, and a skin patching allocating assembly, a first lifting driving assembly and a heating assembly are mounted on the first support plate; the skin patching allocating assembly is configured to provide a skin patching material that has a surface coated with a glue, a drive end of the first lifting driving assembly is provided with an adsorption assembly, and the adsorption assembly is configured to adsorb and release the skin patching material; the heating assembly includes a heating unit and a plurality of elastic reeds connected to the heating unit, the heating unit is configured to heat the elastic reeds, and the plurality of elastic reeds are distributed on the same circumference, and jointly define an accommodation space; the drive end of the first lifting driving assembly is located in the accommodation space, free ends of the elastic reeds are heating portions, the heating portions are bent towards an interior of the accommodation space to form a frustum-shaped heating space, and a taper of the heating space is equal to a taper of the patching recess; and the heating portion has a first heating surface facing the heating space and a second heating surface facing away from the heating space, the first heating surface is configured to shape and heat the skin patching material placed in the heating space, and the second heating surface is configured to heat an inner wall of the patching recess.

Compared with the prior art, the disclosure has the beneficial effects: the device of the disclosure includes the base, the mounting surface is arranged on the base, and the adjustment mechanism is arranged on the mounting surface, and further has the mounting position for the dummy skin to be mounted. The post-treatment mechanism is arranged on the mounting surface, the post-treatment mechanism includes the rotary operation table, and the cutting station, the grinding station, the skin patching station and the removal station are arranged on the rotary operation table in the circumferential direction. The rotary operation table is configured to place the stations over the mounting position in turn. The skin patching station includes the first support plate, and the skin patching allocating assembly, the first lifting driving assembly and the heating assembly are mounted on the first support plate. The skin patching allocating assembly is configured to provide the skin patching material that has a surface coated with the glue, the adsorption assembly is configured to adsorb and release the skin patching material, and the heating assembly is configured to simultaneously heat the skin patching material and the gate.

In a use process, an injection-molded dummy skin is fixed to the mounting position at first, and the spatial position of the mounting position is adjusted. The injection-molded dummy skin is treated with the post-treatment mechanism according to a specific treatment process as follows: at first, the cutting station is rotated to be over the mounting position, and the injection molding residual material on the surface of the dummy skin is cut by the cutting station. Secondly, the grinding station is rotated to be over the mounting position, and the gate formed after cutting is ground by the grinding station, so as to form the frustum-shaped patching recess. Then, the skin patching station is rotated to be over the mounting position, and the patching recess is filled with the welding skin patching material. Finally, the removal station is rotated to be over the mounting position, to clean the skin patching position on the dummy skin.

A patching process of the skin patching station specifically includes: at first, the first lifting driving assembly drives the adsorption assembly to suck up the skin patching material that has a surface coated with the glue and transport same into the accommodation space. By adjusting the position of the mounting position, the inner wall of the frustum-shaped patching recess is attached to the second heating surface of the heating portion, and the first heating surface of the heating portion is attached to the skin patching material. Secondly, the skin patching material and the frustum-shaped patching recess are simultaneously heated by the heating portion to obtain a frustum-shaped skin patching material. Finally, the frustum-shaped skin patching material is pushed to the inner wall of the frustum-shaped patching recess, to make same be attached to the inner wall of the frustum-shaped patching recess, the adsorption assembly releases the skin patching material, and the patching material and the frustum-shaped patching recess are combined together, so as to complete a skin patching operation.

In the disclosure, the automatic cutting station, grinding station, skin patching station and removal station are arranged to complete a post-treatment operation of dummy skin manufacturing, a manual operation in the prior art is replaced, and working efficiency is improved. The frustum-shaped skin patching material is formed by grinding the gate into the frustum-shaped patching recess, and heating and simultaneously shaping the skin patching material with the heating assembly. By putting the frustum-shaped skin patching material into the frustum-shaped patching recess, the frustum-shaped skin patching material and the frustum-shaped patching recess can be attached to each other more tightly and a firmer binding effect is achieved. However, in the prior art, since a skin patching material is usually round and a gate is also round, it is difficult for the skin patching material to be completely and tightly attached to the gate, resulting in poor sealing. In addition, in the disclosure, the skin patching material and the gate are simultaneously heated, and heating temperatures of the skin patching material and the gate can be simultaneously controlled, such that binding strength of the skin patching material and the gate can be enhanced. However, in the prior art, a heated skin patching material and gate are inconsistent in temperature due to a difficulty of control over a heating temperature, such that a binding strength of the skin patching material and the gate is reduced. After binding, a residual material formed at a binding position since a molten skin material is squeezed out and solidified on a surface of a skin layer is removed, thus improving integrity of a joint.

DETAILED DESCRIPTION OF THE EMBODIMENTS

Figure 1:
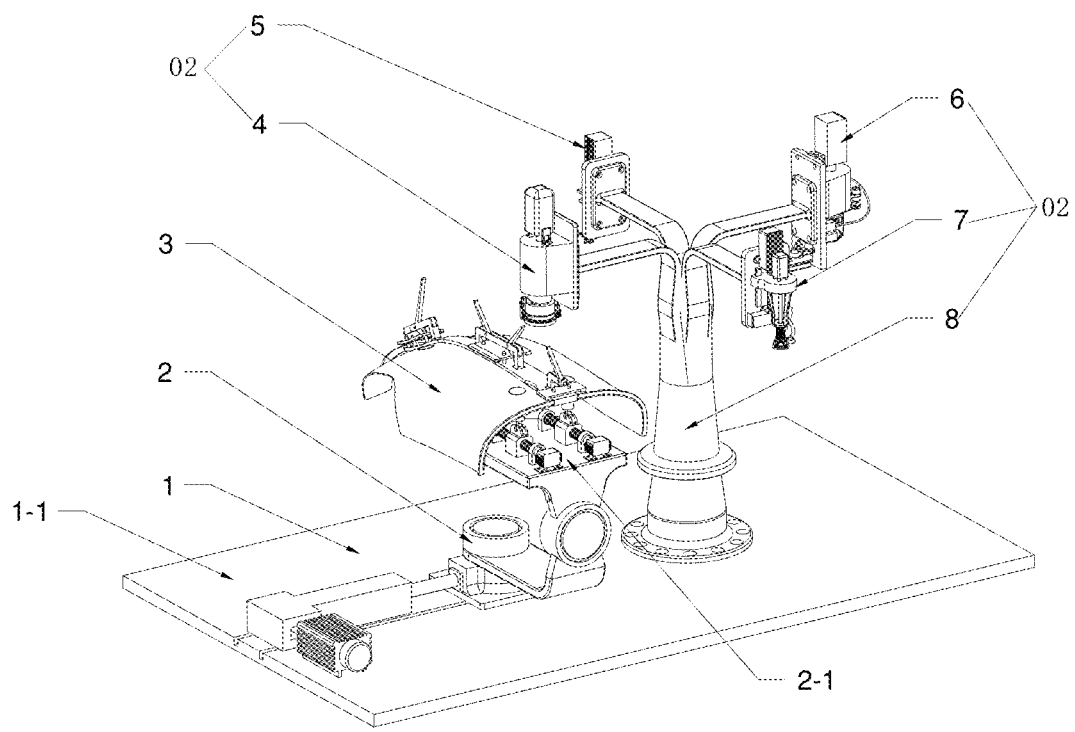
FIG. 1 shows a general assembly diagram of a chest skin manufacturing post-treatment apparatus for a collision dummy according to an example of the disclosure.

In order to make the technical solution of the disclosure better understood by those skilled in the art, the disclosure will be described in detail with reference to the accompanying drawings. The description of this part is merely illustrative and explanatory, and should not limit the protection scope of the disclosure.

The disclosure provides a skin manufacturing post-treatment device for an automobile collision dummy. The device includes:

a base 1, where the base 1 has a mounting surface 1-1;

an adjustment mechanism 2, where the adjustment mechanism 2 is mounted on the mounting surface 1-1 and has a mounting position 2-1 for a dummy skin 01 to be mounted, and a spatial position of the mounting position 2-1 is adjustable; and the dummy skin 01 is made through an injection molding process; and a post-treatment mechanism 02, where post-treatment mechanism 02 is mounted on the mounting surface 1-1 and located at a side of the adjustment mechanism 2, and the post-treatment mechanism 02 includes a rotary operation table 8; a cutting station 4, a grinding station 7, a skin patching station 6 and a removal station 5 are sequentially arranged on the rotary operation table 8 in a circumferential direction, and the rotary operation table 8 is configured to place the stations over the mounting position 2-1 in turn; the cutting station 4 is configured to cut an injection molding residual material 01-1 on a surface of the dummy skin 01, the grinding station 7 is configured to grind a cut position to form a frustum-shaped patching recess 7-13, and an opening end of the patching recess 7-13 is a large-diameter end; and the skin patching station 6 is configured to fill the patching recess 7-13 with a welding skin patching material 6-25, and the removal station 5 is configured to clean a skin patching position.

Figure 2:
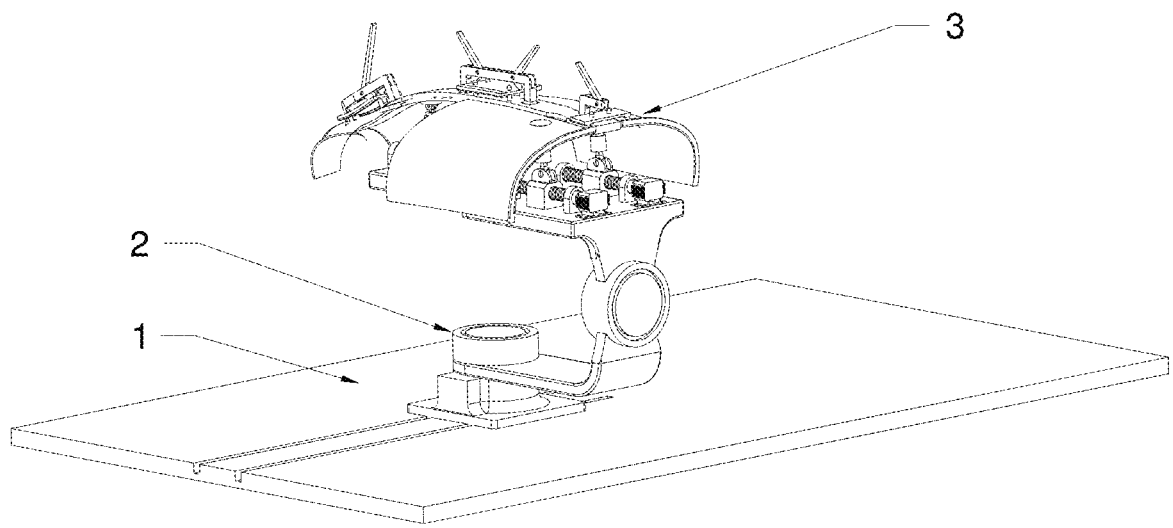
FIG. 2 shows a schematic diagram of arranging a skin dismounting clamp on a base according to an example of the disclosure.
Figure 5:
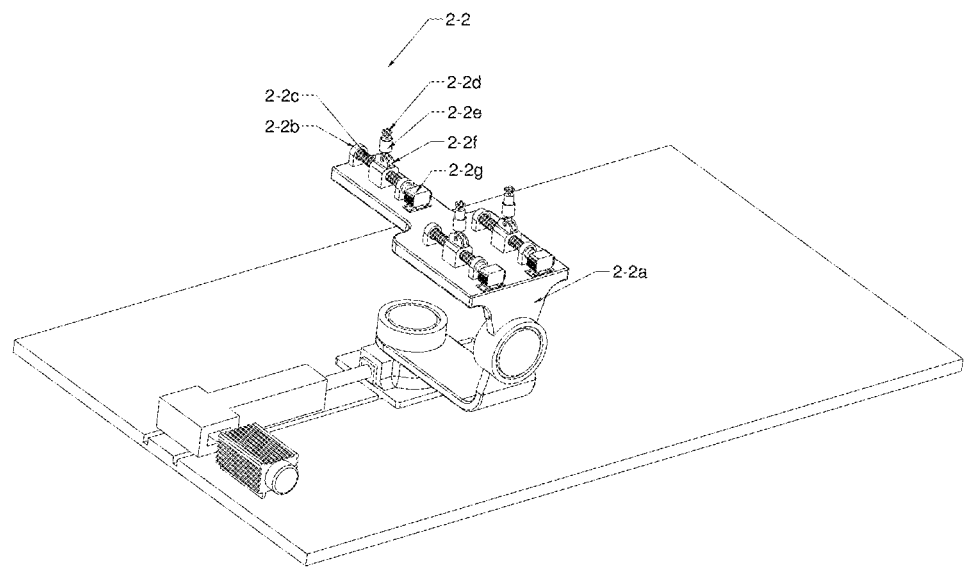
FIG. 5 shows a schematic structural diagram of an adjustment mechanism according to an example of the disclosure.

As shown in FIGS. 1, 2 and 5, the mounting surface 1-1 is mounted on the base 1, and the adjustment mechanism 2 is arranged on the mounting surface 1-1. The adjustment mechanism 2 is a six-degree-of-freedom adjustment structure, and is configured to drive the mounting position 2-1 to implement six-degree-of-freedom adjustable movement in a certain range, that is, translation and rotation along the x, y and z axes, or adjustment of the spatial position of the mounting position 2-1. In this example, the x axis is a length direction of base 1, the y axis is a width direction of base 1, and the z axis is a vertical direction. The adjustment mechanism 2 may be, for example, a six-degree-of-freedom mechanical arm in the prior art.

As shown in FIG. 5, the mounting position 2-1 includes a translational T-shaped table 2-2a; a skin dismounting clamp 3 is arranged on the translational T-shaped table 2-2a, and the skin dismounting clamp 3 includes a support cover 3-2 for supporting the dummy skin 01 and a fixation assembly 3-1 for fixing the dummy skin 01 to the support cover 3-2; and at least two support assemblies 2-2 are further arranged on the translational T-shaped table 2-2a, and the support assemblies 2-2 are configured to support the support cover 3-2.

In this example, three support assemblies 2-2 are arranged on the translational T-shaped table 2-2a, the three support assemblies 2-2 jointly support the support cover 3-2. The support assembly 2-2 includes a clamp end hinge 2-2d configured to come into contact with an inner wall of the support cover 3-2 and a transverse and longitudinal adjustment assembly. The transverse and longitudinal adjustment assembly is configured to drive the clamp end hinge 2-2d to be adjusted in position in a length direction of the translational T-shaped table 2-2a and be adjusted in height in a vertical direction, so as to support the support covers 3-2 that have different sizes, and further support skins to be patched that have different sizes. The transverse and longitudinal adjustment assembly is any device in the prior art that can implement adjustment in horizontal and vertical directions. For example, in this example, as shown in FIG. 5, the transverse and longitudinal adjustment assembly includes a worm bearing 2-2b arranged on the translational T-shaped table 2-2a and a translation worm 2-2c connected to the worm bearing 2-2b. The translation worm 2-2c extends in an extension direction of the translational T-shaped table 2-2a. As shown in FIG. 5, a worm drive motor 2-2g is mounted at the other end of the translation worm 2-2c. The worm drive motor 2-2g is configured to drive the translation worm 2-2c to rotate. A fixation seat sleeves the translation worm 2-2c, the fixation seat is slidably connected to the translational T-shaped table 2-2a, that is, the fixed seat may slide in the extension direction of the translational T-shaped table 2-2a. A platform end hinge 2-2f is arranged on the fixation seat, a hydraulic piston tappet 2-2e is further arranged above the platform end hinge 2-2f, and the clamp end hinge 2-2d is mounted at a drive end of the hydraulic piston tappet 2-2e, and the hydraulic piston tappet 2-2e is configured to drive the clamp end hinge 2-2d to move in the vertical direction.

Figure 3A:
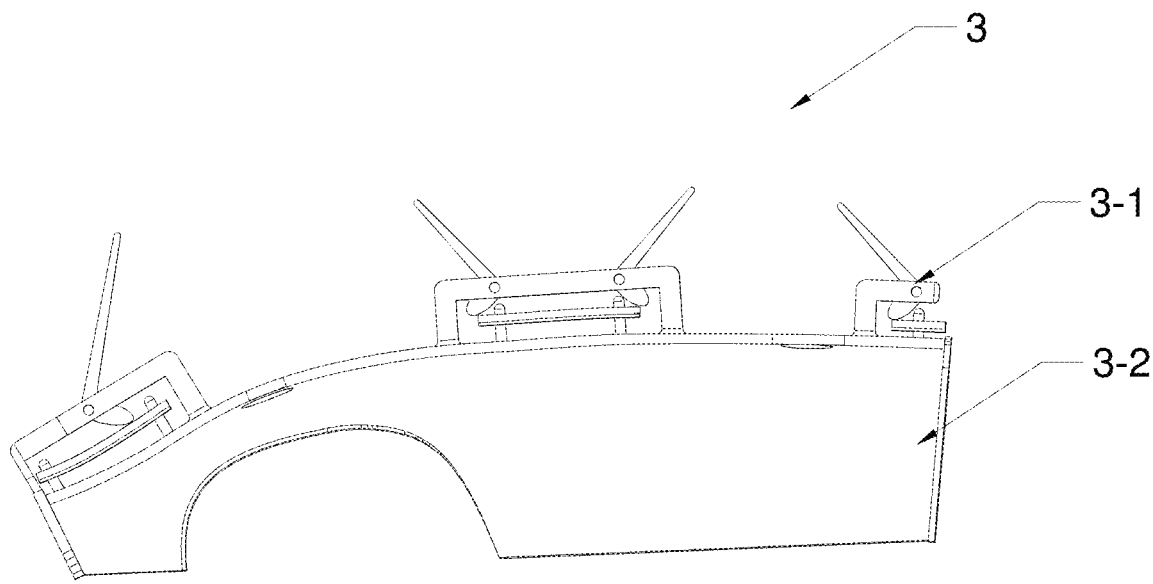
FIG. 3a shows a schematic diagram I of a skin dismounting clamp according to an example of the disclosure.
Figure 3B:
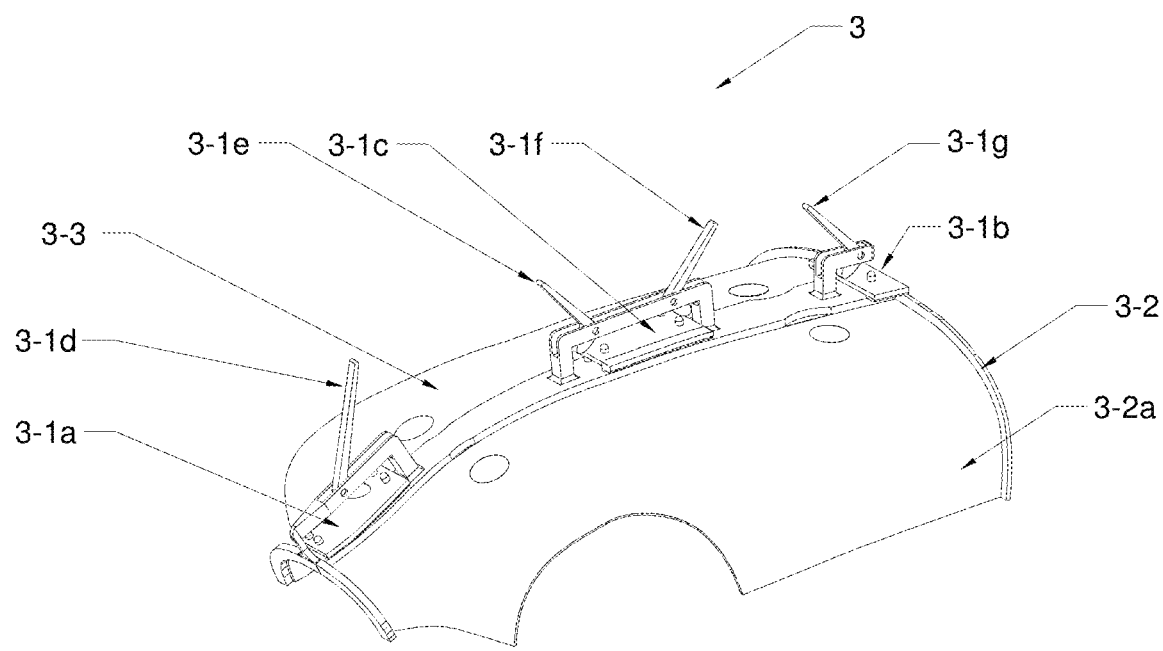
FIG. 3b shows a schematic diagram II of a skin dismounting clamp according to an example of the disclosure.
Figure 4A:
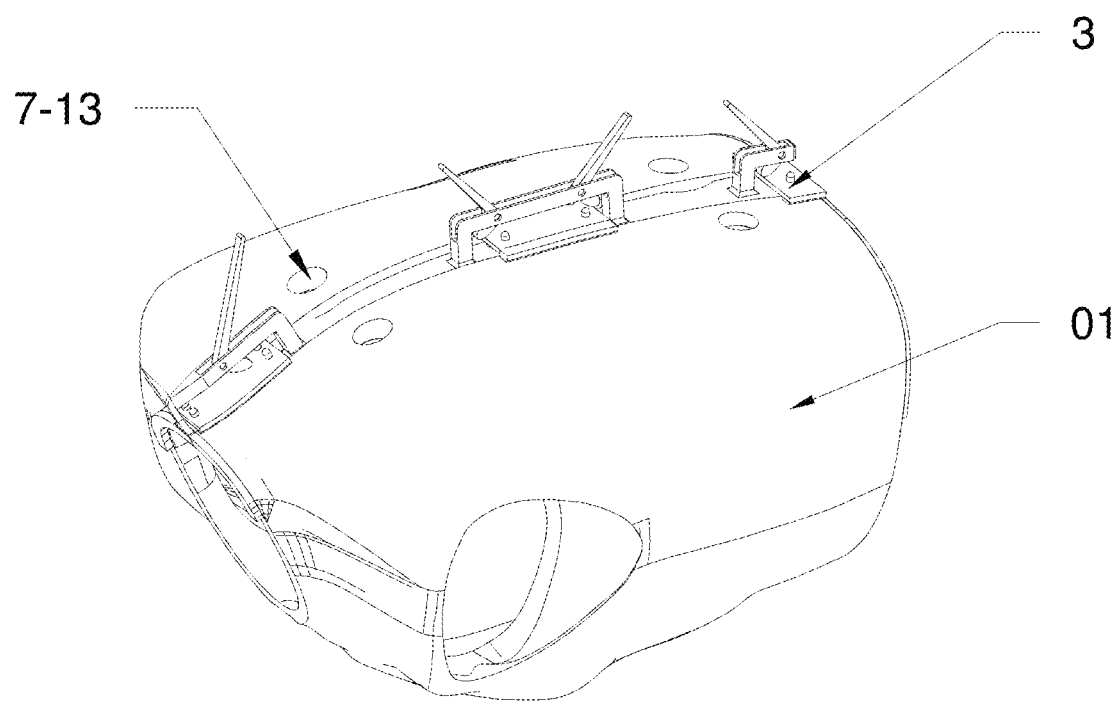
FIG. 4a shows an effect diagram of a chest skin clamping state according to an example of the disclosure.

As shown in FIGS. 3a and 3b, the fixation assembly 3-1 is configured to fix the dummy skin 01 to be patched to a surface (that is, a clamp body bearing curved surface 3-2a), far away from the support assembly 2-2, of the support cover 3-2. In this example, a chest skin is to be patched, and a middle of the chest skin is provided with a gap for sewing a zipper. The fixation assembly 3-1 includes a fixation strip that is located in a middle of the clamp body bearing curved surface 3-2a and fixedly connected to the clamp body bearing curved surface, and a locking handle fixed to the fixation strip, and four upright posts are arranged on the fixation strip. The fixation assembly 3-1 further includes a pressing plate, and four holes are provided in the pressing plate. When in use, the skin to be patched is placed on an upper surface of the support cover 3-2 at first, then the gap with the sewn zipper corresponds to the fixation strip to an extent that two sides, in a length direction of the fixation strip are partially or completely covered by two edges, close to each other, of the gap, then, the four holes in the pressing plate sleeve the corresponding four upright posts, and the locking handle is rotated to press the chest skin between the pressing plate and the clamp body bearing curved surface 3-2a. In this example, three pressing plates, that is, a front-end skin pressing plate 3-1a, a central skin pressing plate 3-1c and a rear-end skin pressing plate 3-1b are provided. A locking handle corresponding to the front-end skin pressing plate 3-1a is a front-end pressing plate locking handle 3-1*d*, locking handles corresponding to the central skin pressing plate 3-1*c* are a central skin pressing plate 3-1*c* front-end locking handle and a central skin pressing plate 3-1*c* rear-end locking handle 3-4*b*, and a locking handle corresponding to the rear-end skin pressing plate 3-1*b* is a rear-end pressing plate locking handle 3-1*g*. During mounting, since a front-end skin has a great curvature and a high hardness, the front-end pressing plate locking handle 3-1*d* is first pressed, to make the front-end skin pressing plate 3-1*a* cling to the skin surface and generate a sufficient pressure, and then other positions are pressed until the chest skin is fixed to the support cover 3-2. A final mounting effect is shown in FIG. 4*a*.

Figure 6:
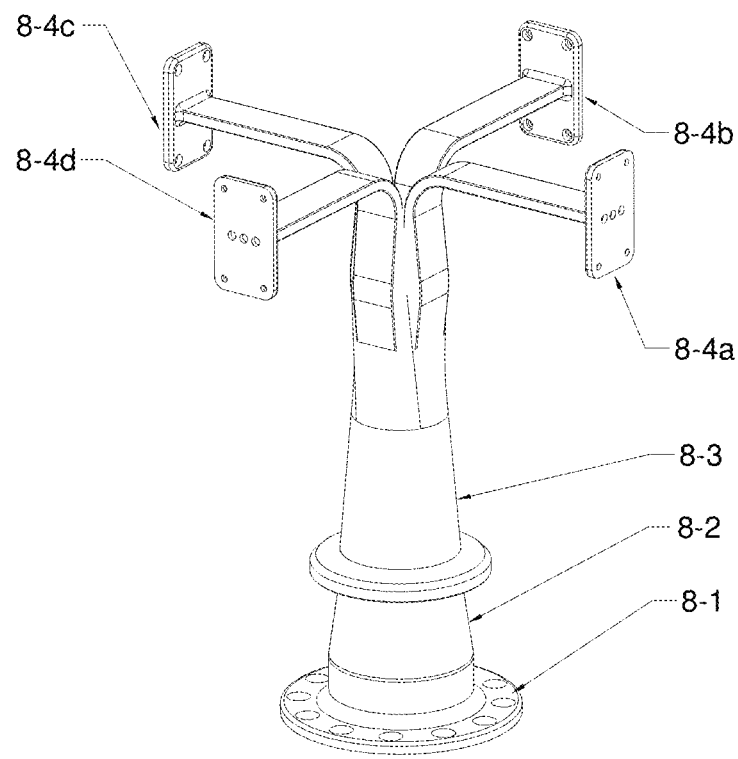
FIG. 6 shows a schematic structural diagram of a rotary operation table for a dummy skin according to an example of the disclosure.

The post-treatment mechanism 02 is mounted on the mounting surface 1-1 and located at a side of the adjustment mechanism 2. The post-treatment mechanism 02 includes the rotary operation table 8. As shown in FIG. 6, the rotary operation table 8 includes a bottom base 8-1 mounted on the mounting surface 1-1, a rotation motor 8-2 is mounted on the bottom base 8-1, and a four-link rotary arm 8-3 is mounted at a drive end of the rotation motor 8-2. The four-link rotary arm 8-3 may rotate relative to the base 1 under the action of drive of the rotation motor 8-2. The cutting station 4, the grinding station 7, the skin patching station 6 and the removal station 5 are sequentially mounted at a tail end of the four-link rotary arm 8-3 in the circumferential direction, and the four stations are distributed at an equal angle of 90°.

As shown in FIGS. 7, 8*a*, 8*b*, 8*c* and 9, the cutting station 4 includes: a second support plate 8-4*a*, a second lifting driving assembly 4-1 is mounted on the second support plate 8-4*a*, and a cutting assembly 4-2' is mounted on a drive end of the second lifting driving assembly 4-1. The cutting assembly 4-2' includes a direct-acting sleeve 4-3 that is connected to the drive end of the second lifting driving assembly 4-1, the other end of the direct-acting sleeve (4-3) is rotatably connected to an upper rotary ring 4-4, and an end of the upper rotary ring 4-4 is rotatably connected to a lower rotary ring 4-7. An upper rotary ring servo motor 4-5 is arranged on the direct-acting sleeve 4-3, a lower rotary ring servo motor 4-8 is arranged on the upper rotary ring 4-4, and the upper rotary ring servo motor and the lower rotary ring servo motor are configured to drive the upper rotary ring 4-4 and the lower rotary ring 4-7 to rotate respectively; an outer wall of the upper rotary ring 4-4 is further provided with a copper wire tensioning wheel 4-14 and a copper wire inlet hole 4-15 for a copper wire 4-16 to enter and exit, an inner wall of the lower rotary ring 4-7 is provided with a copper wire tractor 4-13 and a copper wire heating body 4-12, and the copper wire heating body 4-12 is configured to heat the copper wire 4-16. The copper wire 4-16 forms cutting strings 4-17 that have different sizes in an inner cavity of the lower rotary ring 4-7 under the condition that the upper rotary ring 4-4 is motionless and the lower rotary ring 4-7 rotates, and the cutting strings are configured to cut the injection molding residual material 01-1. A clamping assembly 4-11 is arranged in the direct-acting sleeve 4-3, and the clamping assembly 4-11 is configured to clamp the injection molding residual material 01-1.

Figure 7:
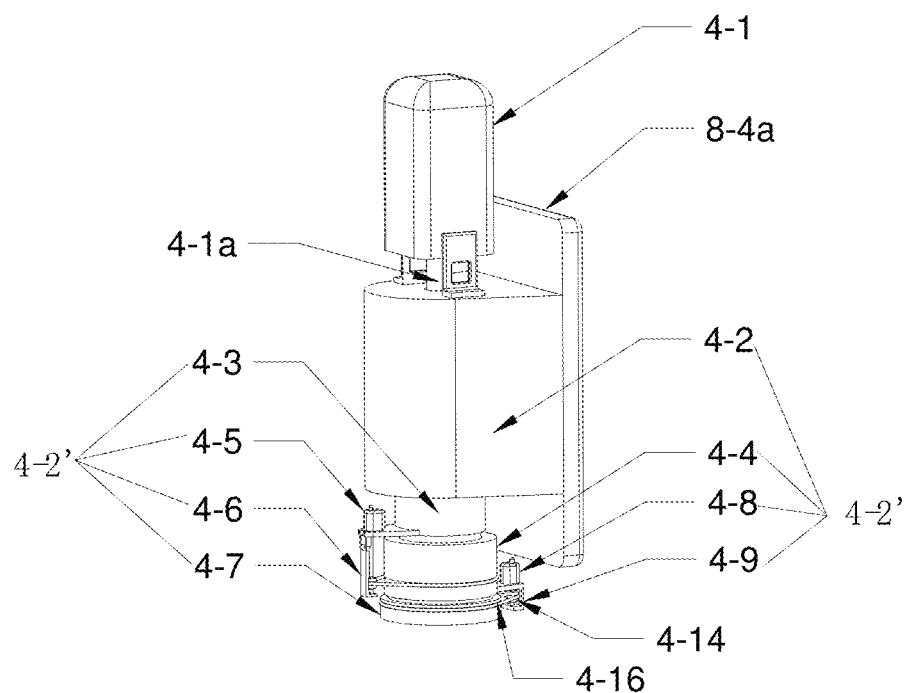
FIG. 7 shows a schematic structural diagram of a cutting station according to an example of the disclosure.
Figure 8A:
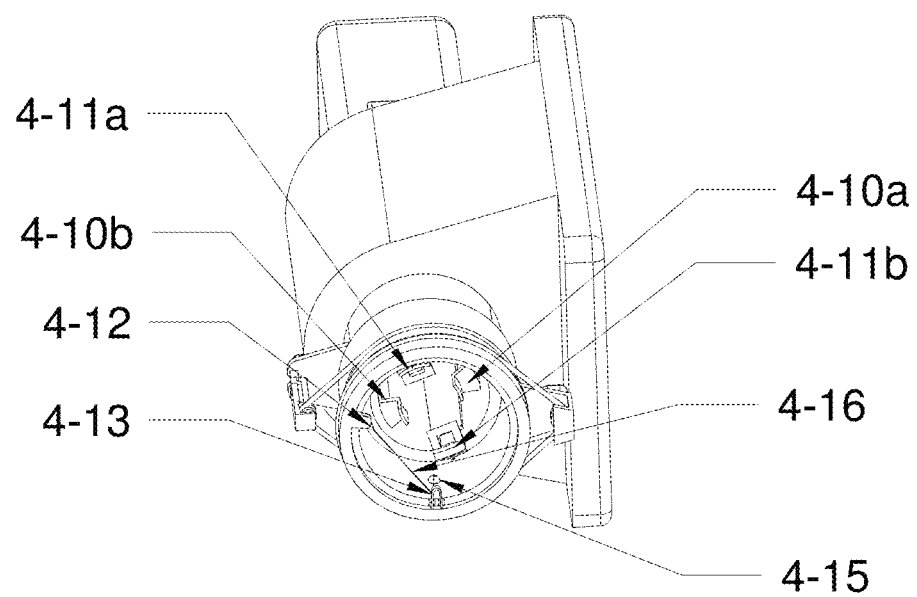
FIG. 8a shows a schematic internal diagram I of a cutting station according to an example of the disclosure.
Figure 8B:
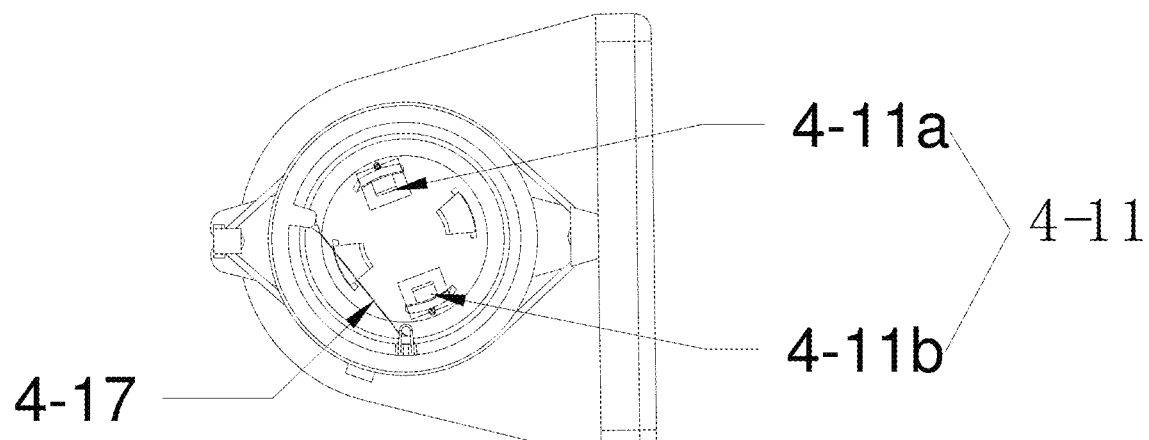
FIG. 8b shows a schematic internal diagram II of a cutting station according to an example of the disclosure.

After the previous work is completed, the cutting station 4 is rotated to be over the mounting position 2-1 by using the rotary operation table 8, to cut the injection molding residual material 01-1 on the surface of the dummy skin 01, and form a circular gate. A specific structure of the cutting station 4 is as follows:

The second lifting driving assembly 4-1 is any motor that is capable of implementing movement in the vertical direction in the prior art. In this example, the second lifting driving assembly is a linear drive motor. A cutting assembly shell 4-2 is arranged on the second support plate 8-4*a*, and the drive end of the second lifting driving assembly 4-1 penetrates into the cutting assembly shell 4-2. The cutting assembly 4-2' is mounted at the drive end of the second lifting driving assembly 4-1, the cutting assembly 4-2' includes the direct-acting sleeve 4-3 connected to the drive end of the second lifting driving assembly 4-1 as shown in FIGS. 7 and 8*a*, and the upper rotary ring 4-4 is rotatably connected at the other end of the direct-acting sleeve 4-3. The upper rotary ring servo motor 4-5 is arranged on an outer side wall of the direct-acting sleeve 4-3, an upper rotary ring servo motor speed reducer 4-6 is mounted at a drive end of the upper rotary ring servo motor 4-5, and a drive end of the upper rotary ring servo motor speed reducer 4-6 is connected to the upper rotary ring 4-4 through belt transmission. When the upper rotary ring servo motor 4-5 rotates, the upper rotary ring 4-4 also rotates under the action of belt transmission. The outer wall of the upper rotary ring 4-4 is provided with the lower rotary ring servo motor 4-8, a drive end of the lower rotary ring servo motor 4-8 is connected to a lower rotary ring servo motor speed reducer 4-9, and the lower rotary ring servo motor speed reducer 4-9 is connected to the lower rotary ring 4-7 through belt transmission. The lower rotary ring 4-7 is rotatably connected below the upper rotary ring 4-4. A part of the lower rotary ring 4-7 sleeves an exterior of the upper rotary ring 4-4. When the drive end of the lower rotary ring servo motor 4-8 rotates, the lower rotary ring 4-7 also rotates under the action of belt transmission. Since the lower rotary ring servo motor 4-8 is fixed to the upper rotary ring 4-4, when the upper rotary ring 4-4 rotates, the lower rotary ring 4-7 also rotates synchronously even if the lower rotary ring servo motor 4-8 is not turned on.

Figure 8C:
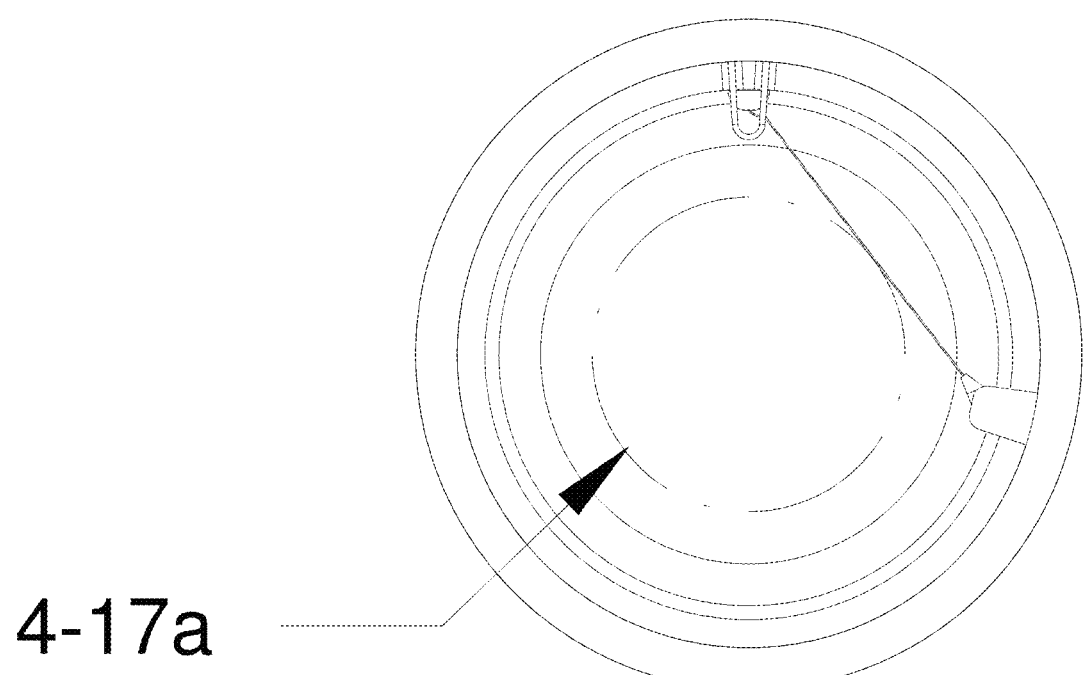
FIG. 8c shows a schematic internal diagram III of a cutting station according to an example of the disclosure.
Figure 25:
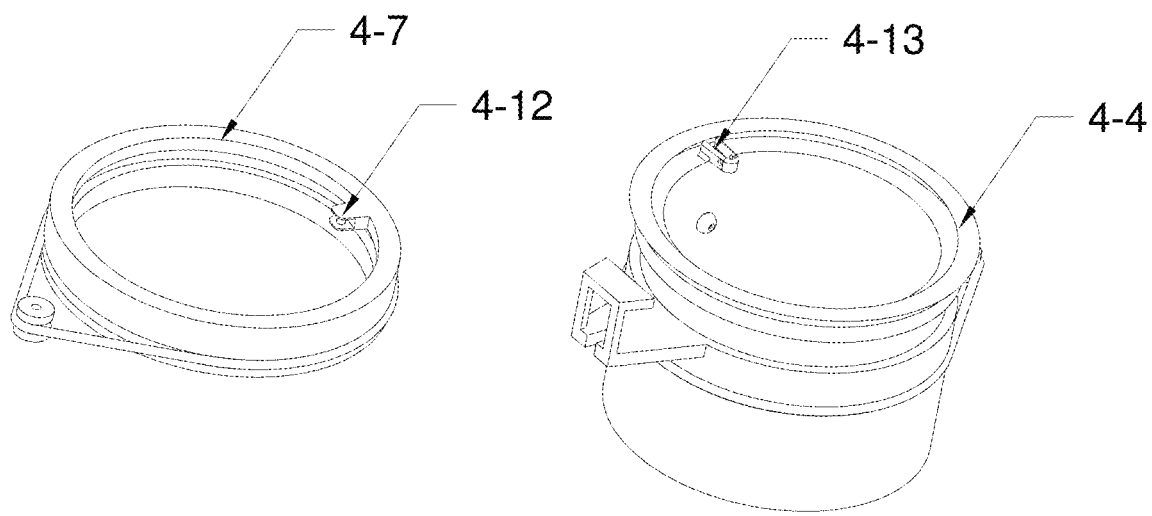
FIG. 25 shows a schematic diagram of an upper rotary ring and a lower rotary ring according to an example of the disclosure.

A mounting support is mounted at the outer wall of the upper rotary ring 4-4, and the copper wire tensioning wheel 4-14 that is configured to wind the copper wire 4-16 is arranged on the mounting support. The copper wire tensioning wheel 4-14 may rotate around its own central axis, and an extension direction of the central axis is a vertical direction. The copper wire inlet hole 4-15 is provided in the side wall of the upper rotary ring 4-4, and a bottom of the upper rotary ring 4-4 is provided with the copper wire tractor 4-13, as shown in FIG. 25. The copper wire tractor 4-13 includes a first traction portion and a second traction portion, the first traction portion and the second traction portion extend in a direction far away from the inner wall of the upper rotary ring 4-4, and the other ends of the first traction portion and the second traction portion are provided with copper wire passing holes respectively. The two copper wire passing holes form a guide channel for the copper wires 4-16 to pass therethrough, so as to prevent the copper wire 4-16 from being broken when extended or shortened. The copper wire heating body 4-12 is arranged on a bottom of an inner wall of the lower rotary ring 4-7, as shown in FIG. 25, the copper wire heating body 4-12 and the copper wire tractor 4-13 are on the same horizontal plane, a free end of the copper wire 4-16 is connected to the copper wire heating body 4-12, and the copper wire heating body 4-12 is configured to heat the copper wire 4-16. When the lower rotary ring 4-7 rotates, the copper wire heating body 4-12 pulls the copper wire 4-16 to correspondingly extend or shorten the copper wire 4-16 in the cavity of the lower rotary ring 4-7, thus forming envelope circles 4-17*a* that have different diameters (as shown in FIG. 8*c*) for cutting a skin layer and a muscle layer on the injection molding residual material 01-1.

Figure 9:
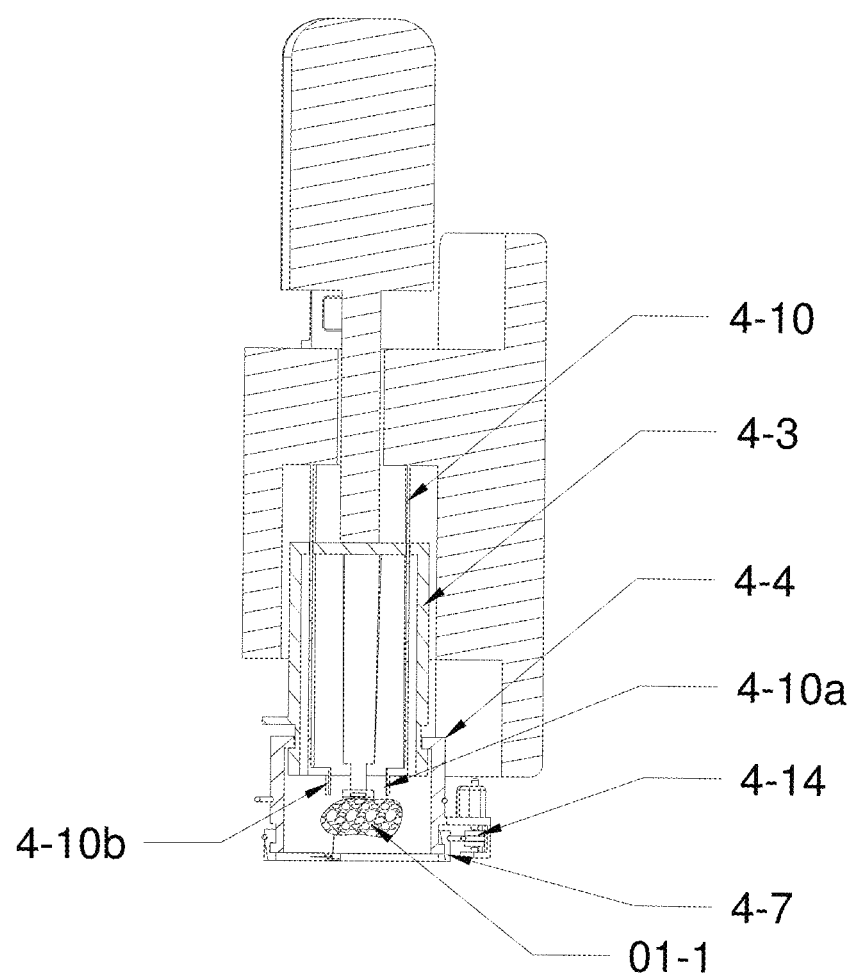
FIG. 9 shows a sectional view of a cutting station according to an example of the disclosure.
Figure 23:
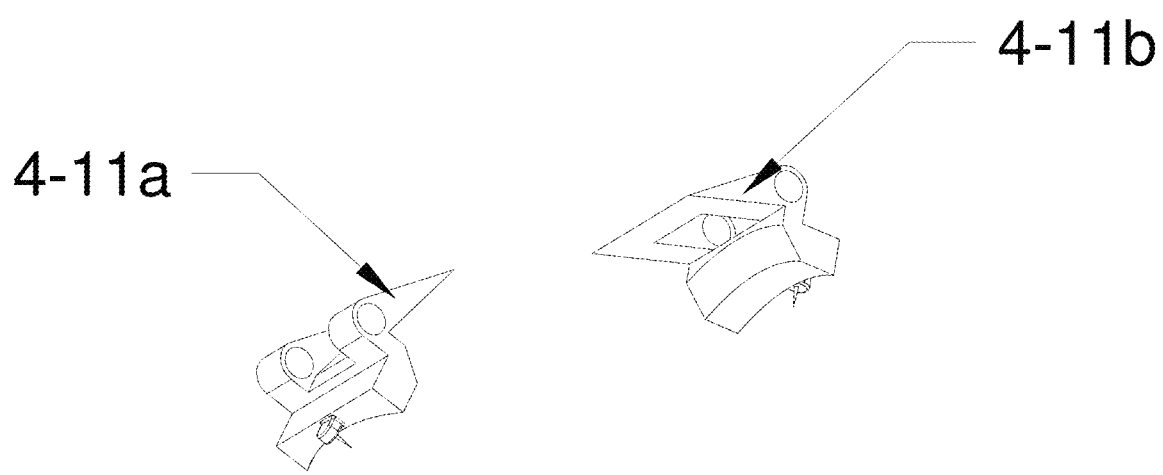
FIG. 23 shows a schematic structural diagram of a material cutting clamping arm pricking pin according to an example of the disclosure.

As shown in FIG. 9, the clamping assembly 4-11 includes two second fixation portions arranged inside the direct-acting sleeve 4-3, a first material cutting clamping arm 4-11a and a second material cutting clamping arm 4-11b are rotatably connected to the second fixation portions, and pricking pins are arranged at one ends, close to each other, of the first material cutting clamping arm 4-11a and the second material cutting clamping arm 4-11b, as shown in FIG. 23. The pricking pins can be pricked into the injection molding residual material 01-1 as the injection molding residual material 01-1 enters into the direct-acting sleeve 4-3, so as to hold the injection molding residual material 01-1 tightly.

Figure 10:
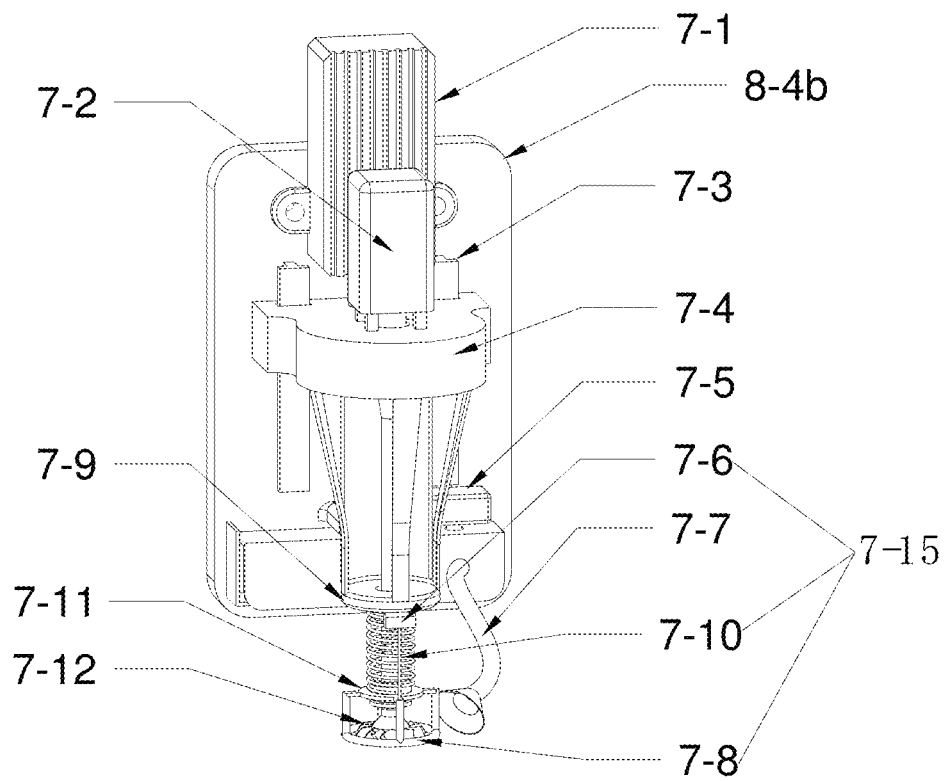
FIG. 10 shows a schematic structural diagram of a grinding station according to an example of the disclosure.

As shown in FIGS. 8a, 9 and 10, a first separation ejection rod 4-10a and a second separation ejection rod 4-10b are arranged inside the cutting assembly shell 4-2, and the first separation ejection rod 4-10a and the second separation ejection rod 4-10b movably penetrate the direct-acting sleeve 4-3. As can be seen from FIGS. 8a and 9, the first separation ejection rod 4-10a and the second separation ejection rod 4-10b are located above the first material cutting clamping arm 4-11a and the second material cutting clamping arm 4-11b. One ends of the first separation ejection rod 4-10a and the second separation ejection rod 4-10b are connected to first fixation portions 4-10 extending in the vertical direction, and the first fixation portion 4-10 is arranged inside the cutting assembly shell 4-2, and is fixedly connected to an interior of the cutting assembly shell 4-2. The first separation ejection rod 4-10a and the second separation ejection rod 4-10b that are arranged at one ends of the first fixation portion 4-10 are also arranged inside the cutting assembly shell 4-2, and the first separation ejection rod 4-10a and the second separation ejection rod 4-10b are approximately L-shaped. When the tightly held injection leftover 01-1 touches the first and second separation ejection rods 4-10a and 4-10b during continuous upward movement of the drive end 4-1a of the second lifting driving assembly, the first separation ejection rod 4-10a and the second separation ejection rod 4-10b eject the injection molding residual material 01-1 out and make same exit from the interior of the direct-acting sleeve 4-3.

In a use process, the cutting station 4 is rotated to be over the mounting position 2-1 by using the rotary operation table 8, and then an axis of the gate is coincident with an axis of the direct-acting sleeve 4-3 by adjusting the position of the mounting position 2-1. The direct-acting sleeve 4-3 moves in a negative direction of the z axis under the drive by the second lifting driving assembly 4-1 until a bottom surface of the lower rotary ring 4-7 is just attached to a surface of a skin layer next to the injection molding residual material 01-1. During downward movement of the lower rotary ring 4-7, the injection molding residual material 01-1 enters into the direct-acting sleeve 4-3, to jack up the first material cutting clamping arm 4-11a and the second material cutting clamping arm 4-11b inside the direct-acting sleeve. During a jacking process, the injection molding residual material 01-1 makes the first material cutting clamping arm 4-11a and the second cutting material holding arm 4-11b rotate away from each other until the pricking pins on the first material cutting clamping arm 4-11a and the second cutting material holding arm 4-11b are pricked into the excess injection molding residual material 01-1. In this case, the excess injection molding residual material 01-1 on the gate is completely clamped firmly. Then the lower rotary ring servo motor 4-8 is turned on, the lower rotary ring 4-7 rotates, and the copper wire heating body 4-12 change in position relative to the copper wire tractor 4-13. Under the movement of the copper wire heating body 4-12, the copper wire 4-16 gradually forms a cutting string 4-17 with an appropriate length in the lower rotary ring 4-7. The cutting string 4-17 is parallel to the horizontal plane. The copper wire heating body 4-12 and the upper rotary ring servo motor 4-5 are turned on, such that the upper rotary ring 4-4 drives its lower portion to rotate integrally, and the cutting string 4-17 rotates around a central axis of the lower rotary ring 4-7, and a swept central surface is guaranteed to form the envelope circle 4-17a that has a specified diameter. A radius of the envelope circle 4-17a is equal to a distance between a central axis of the gate and an inner layer of the skin layer. In this way, the heated copper wire 4-16 can merely perform hot cutting on a skin layer material of the injection molding residual material 01-1, without hurting the muscle layer. Since a designed diameter of the copper wire 4-16 is 0.1 mm, and the copper wire 4-16 has desirable thermal conductivity, the copper wire can quickly cool down after heating stop, and a skin material bound to the copper wire 4-16 is in a semi-molten state as a temperature drops in a skin layer cutting process. In this case, the upper rotary ring 4-4 keeps unchanged in position, and an angle of the lower rotary ring 4-7 is increased, such that a position of the copper wire heating element 4-12 changes, and the copper wire heating body 4-12 and the copper wire tractor 4-13 are located at two ends of a diameter of the lower rotary ring 4-7 respectively. A length of the cutting string 4-17 formed in this case is used as the diameter of the lower rotary ring 4-7. then, the upper rotary ring servo motor 4-5 is turned on, such that the upper rotary ring 4-4 drives its lower portion to rotate integrally, and the copper wire 4-16 performs cold cutting on the muscle layer. When the rotation angle is greater than 180°, cutting is completed, and then the second lifting driving assembly 4-1 moves in a positive direction of the z axis, such that the injection molding residual material 01-1 held by the first material cutting clamping arm 4-11a and the second material cutting clamping arm 4-11b can move simultaneously, and the first separation ejection rod 4-10a and the second separation ejection rod 4-10b eject the injection molding residual material 01-1 to the outside. The hot cutting on the skin layer has an advantage of a small cutting resistance, and avoid the condition that a gate material deforms when cut due to the cutting resistance, and an incision is no longer parallel to the horizontal plane. The cold cutting on the muscle layer is performed for reasons as follows: the muscle layer is flexible and its deformation has no effect on a subsequent process, and in addition, the muscle layer can play a desirable self-cleaning role on the semi-molten skin layer material attached to the copper wire 4-16 due to a dense foam structure, thus making it possible to use apparatuses continuously.

Specifically, in this example, after the cutting is completed, the grinding station 7 is rotated to be over the mounting position 2-1 by using the rotary operation table 8, so as to grind a cut portion of the cutting station 4.

Figure 11:
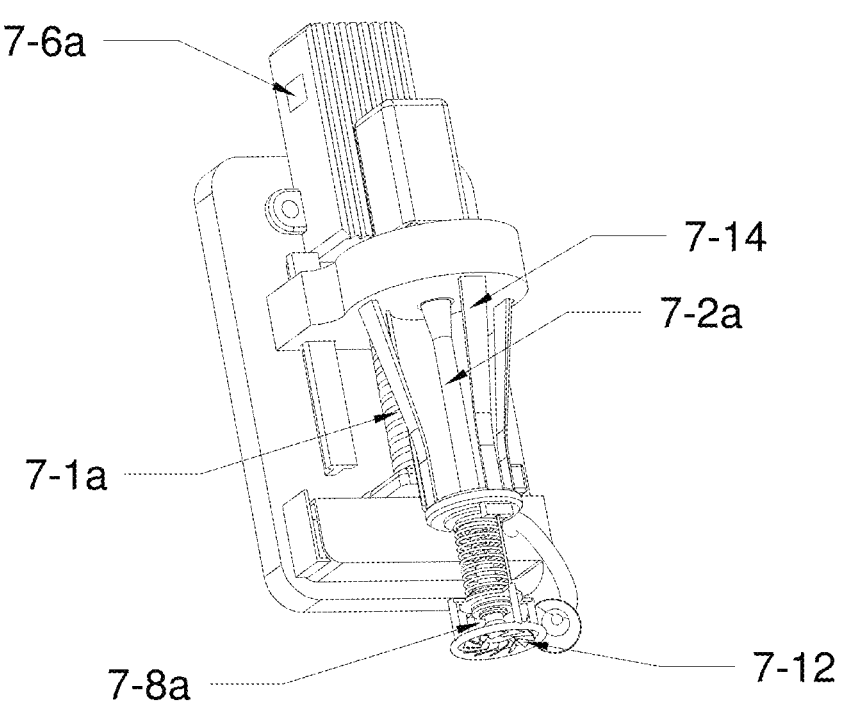
FIG. 11 shows a schematic structural diagram of a cutting head according to an example of the disclosure.

With reference to FIGS. 10 and 11, the grinding station 7 includes: a third support plate 8-4b. A third lifting driving assembly 7-1 is arranged on the third support plate 8-4b, a support platform 7-4 is mounted at a drive end 7-1a of the third lifting driving assembly, a side, far away from the third lifting driving assembly 7-1, of the support platform 7-4 is provided with a shell 7-14, and an end, far away from the support platform 7-4, of the shell 7-14 is connected to a detection assembly 7-15. A grinding assembly motor 7-2 is further arranged on the support platform 7-4, and a rotary cutting head 7-12 is arranged on a drive end 7-2a of the grinding assembly motor.

The detection assembly 7-15 includes a coil spring 7-10 fixedly connected to the shell 7-14, the other end of the coil spring 7-10 is connected to a support frame 7-8, a rotation space 7-8a is formed in the support frame 7-8, and the rotary cutting head 7-12 is located inside the rotation space 7-8a. A displacement sensor 7-6 is further arranged on the shell 7-14, the displacement sensor 7-6 is configured to detect a stretching and retracting amount signal in a vertical direction of the coil spring 7-10, and the displacement sensor 7-6 is in signal connection to a controller 7-6a. The controller 7-6a controls the third lifting driving assembly 7-1 and the grinding assembly motor 7-2 to be turned on and off according to the stretching and retracting amount signal.

Specifically, in this example, a specific structure of the grinding station 7 is as follows: with reference to FIGS. 10 and 11, the drive end of the third lifting driving assembly 7-1 is connected to the support platform 7-4 and is configured to drive the support platform 7-4 to move in the vertical direction. An end, close to the third support plate 8-4b, of the support platform 7-4 is provided with two chutes 5-6c extending in the vertical direction, and two grinding assembly direct-acting rails 7-3 extending in the vertical direction are provided in the third support plate 8-4b. The chutes 5-6c are slidably connected to the grinding assembly direct-acting rails 7-3, and a grinding assembly motor 7-2 is mounted on the support platform 7-4. A drive end of the motor 7-2 of the grinding assembly may rotate around a first axis, and the first axis extends in the vertical direction. The shell 7-14 is mounted below the support platform 7-4, and the shell 7-14 is connected to the coil spring 7-10 through an upper spring base 7-9. The displacement sensor 7-6 may be located on the upper spring base 7-9, the other end of the coil spring 7-10 is connected to a lower spring base 7-11, the other end of the lower spring base 7-11 is connected to a support frame 7-8, and the rotation space 7-8a is formed inside the support frame 7-8. As shown in FIG. 11, an end of the rotary cutting head 7-12 is connected to the drive end 7-2a of the grinding assembly motor. The grinding assembly motor 7-2 is configured to drive the rotary cutting head 7-12 to rotate in the rotation space 7-8a. The displacement sensor 7-6 is further arranged on the upper spring base 7-9, and the controller 7-6a is in signal connection to the third lifting driving assembly 7-1 and the grinding assembly motor 7-2. The displacement sensor 7-6 is configured to detect the stretching and retracting amount in the vertical direction of the coil spring 7-10, and generate a corresponding stretching and retracting amount signal and send same to the controller 7-6a, and the controller 7-6a determines whether to turn on or turn off the third lifting driving assembly 7-1 and the grinding assembly motor 7-2 according to the stretching and retracting amount signal received. A second vacuum pump 7-5 is arranged on the third support plate 8-4b and below the support platform 7-4, and a debris collection hood 7-7 is connected to the second vacuum pump 7-5. The debris collection hood 7-7 faces the rotary cutting head 7-12, and is configured to suck debris generated when the muscle layer is ground. A shape of the rotary cutting head 7-12 is as shown in FIG. 11, the rotary cutting head 7-12 includes multiple blades distributed in the circumferential direction, each of the blades has a semi-circular cambered shape, and a position where the blades come contact with the muscle layer has a slope of 45 degrees.

Figure 4B:
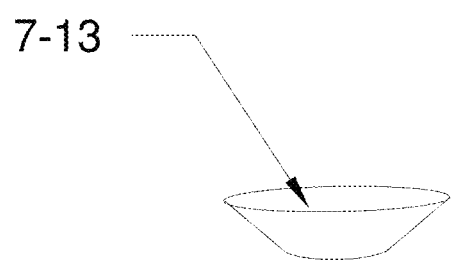
FIG. 4b shows a schematic diagram of a patching recess according to an example of the disclosure.

In use, when an axis of a cut position coincides with an axis of the support frame 7-8, the third lifting driving assembly 7-1 drives the support platform 7-4 to move along the grinding assembly direct-acting rail 7-3, and the displacement sensor 7-6 collects the stretching and retracting amount signal in real time and sends the stretching and retracting amount signal to the controller 7-6a. The controller 7-6a determines the stretching and retracting amount signal after receiving same, sends the stretching and retracting amount signal to the grinding assembly motor 7-2 when determining that the stretching and retracting amount is greater than a set threshold (when the stretching and retracting amount is greater than 0 in this example), and drives the grinding assembly motor 7-2 to start working. The grinding assembly motor 7-2 drives the rotary cutting head 7-12 to grind the muscle layer at the cut position, so as form a frustum-shaped patching recess 7-13 (as shown in FIG. 4b). When determining that the stretching and retracting amount signal satisfies a set displacement, the controller 7-6a sends the stretching and retracting amount signal to the third lifting driving assembly 7-1 and the grinding assembly motor 7-2, the grinding assembly motor 7-2 immediately stops rotating, and the third lifting assembly immediately drives the support platform 7-4 to move in an opposite direction and return to an initial position.

In the process of grinding the muscle layer material, the second vacuum pump 7-5 is turned on, and suction force generated sucks, through the debris collection hood 7-7, the debris generated during grinding.

Further, the skin patching station 6 includes: a first support plate 8-4c, and a skin patching allocating assembly 6-15, a first lifting driving assembly 6-1 and a heating assembly 6-6' are mounted on the first support plate 8-4c. The skin patching allocating assembly 6-15 is configured to provide a skin patching material 6-25 that has a surface coated with a glue, a drive end 6-1a of the first lifting driving assembly is provided with an adsorption assembly 6-11', and the adsorption assembly 6-11' is configured to adsorb and release the skin patching material 6-25. The heating assembly 6-6' includes a heating unit 6-6 and a plurality of elastic reeds 6-13 connected to the heating unit 6-6, the heating unit 6-6 is configured to heat the elastic reeds 6-13, and the plurality of elastic reeds 6-13 are distributed on the same circumference, and jointly define an accommodation space 6-13a. The drive end 6-1a of the first lifting driving assembly 6-1 is located in the accommodation space 6-13a, free ends of the elastic reeds 6-13 are heating portions 6-13b, the heating portions 6-13b are bent towards an interior of the accommodation space 6-13a to form a frustum-shaped heating space 6-13e, and a taper of the heating space 6-13e is equal to a taper of the patching recess 7-13. The heating portion 6-13b has a first heating surface 6-13c facing the heating space 6-13e and a second heating surface 6-13d facing away from the heating space 6-13e, the first heating surface 6-13c is configured to shape and heat the skin patching material 6-25 placed in the heating space 6-13e, and the second heating surface 6-13d is configured to heat an inner wall of the patching recess 7-13.

An elastic turnover diaphragm 6-26 is further mounted between the drive end 6-1a of the first lifting driving assembly 6-1 and the adsorption assembly 6-11', and the elastic turnover diaphragm 6-26 includes a turnover diaphragm body 6-26a. A turnover center ring 6-26c is arranged at the periphery of the turnover diaphragm body 6-26a, an outer edge of the turnover center ring 6-26c is provided with multiple turnover skirts 6-26b, and the multiple turnover skirts 6-26b jointly form a first circular ring 6-26b'. The turnover skirt 6-26b has a first state and a second state, the first circular ring 6-26b' has a first diameter under the condition that the turnover skirt 6-26b is in the first state, the first circular ring 6-26b' has a second diameter under the condition the turnover skirt 6-26*b* is in the second state, and the first diameter is greater than the second diameter.

Figure 12A:
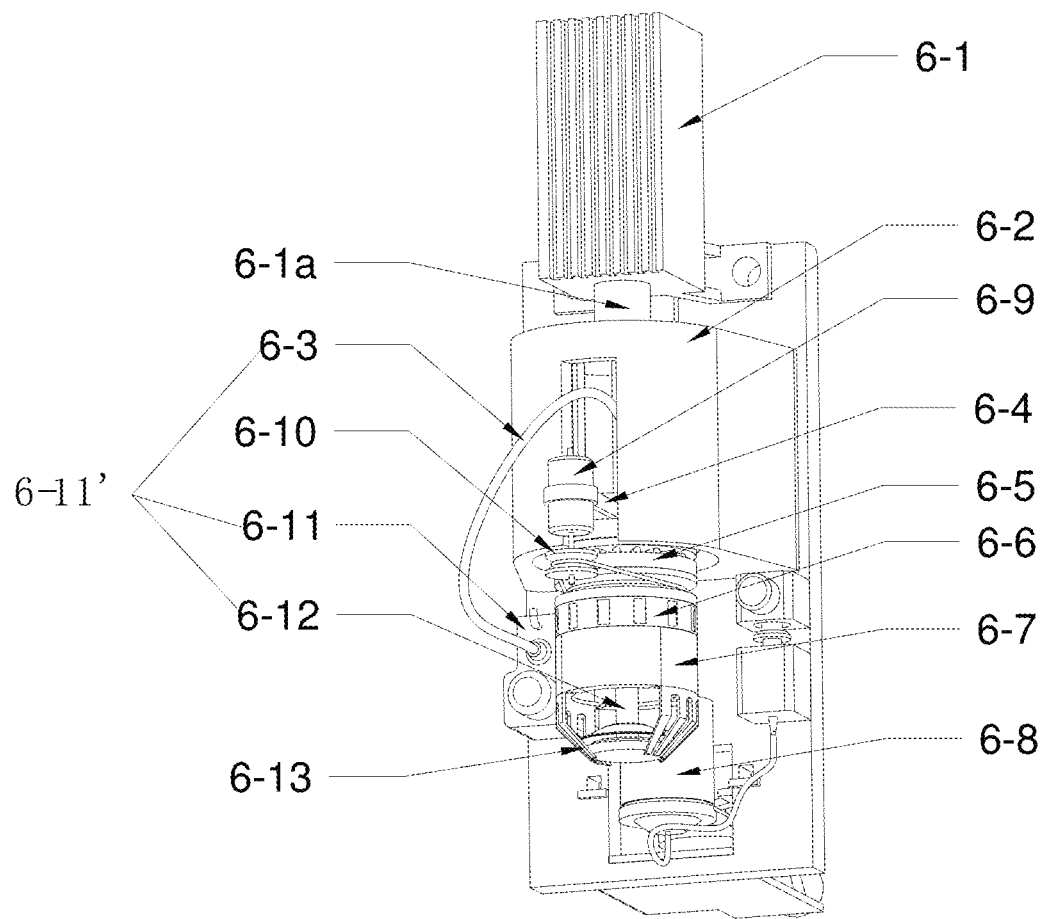
FIG. 12a shows a front view of a skin patching station apparatus according to an example of the disclosure.
Figure 12B:
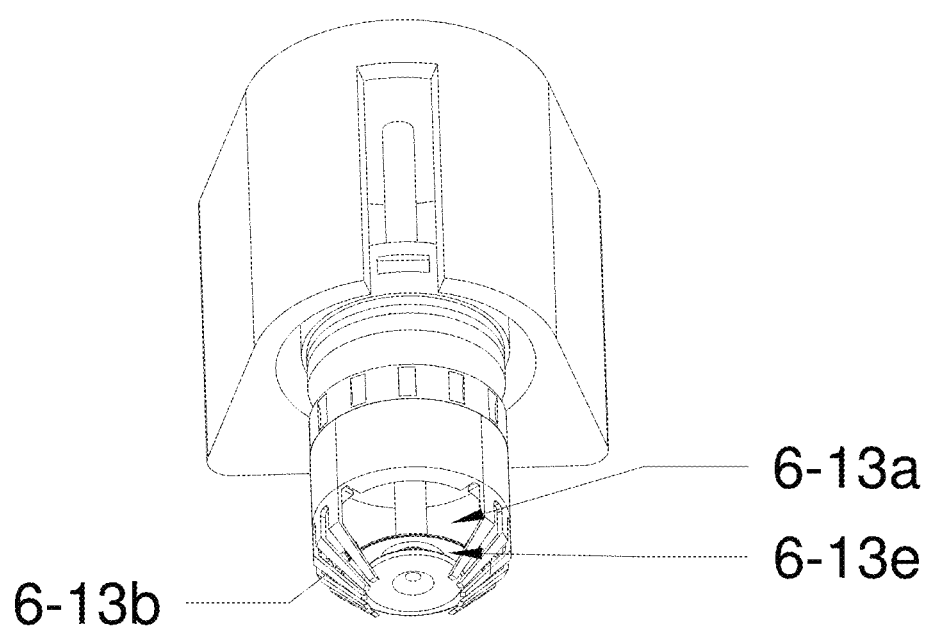
FIG. 12b shows a bottom view of a heating assembly according to an example of the disclosure.
Figure 14A:
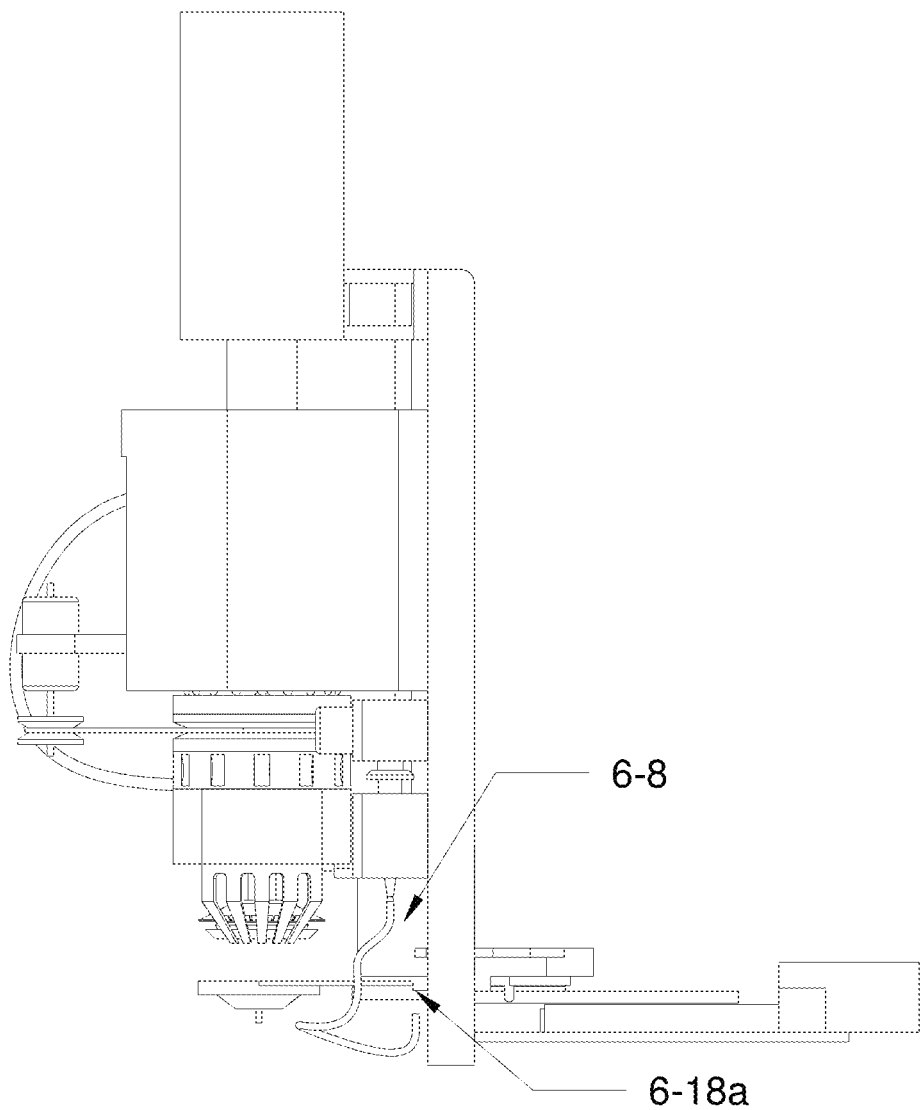
FIG. 14a shows a schematic diagram of a movement member at a first station according to an example of the disclosure.
Figure 14B:
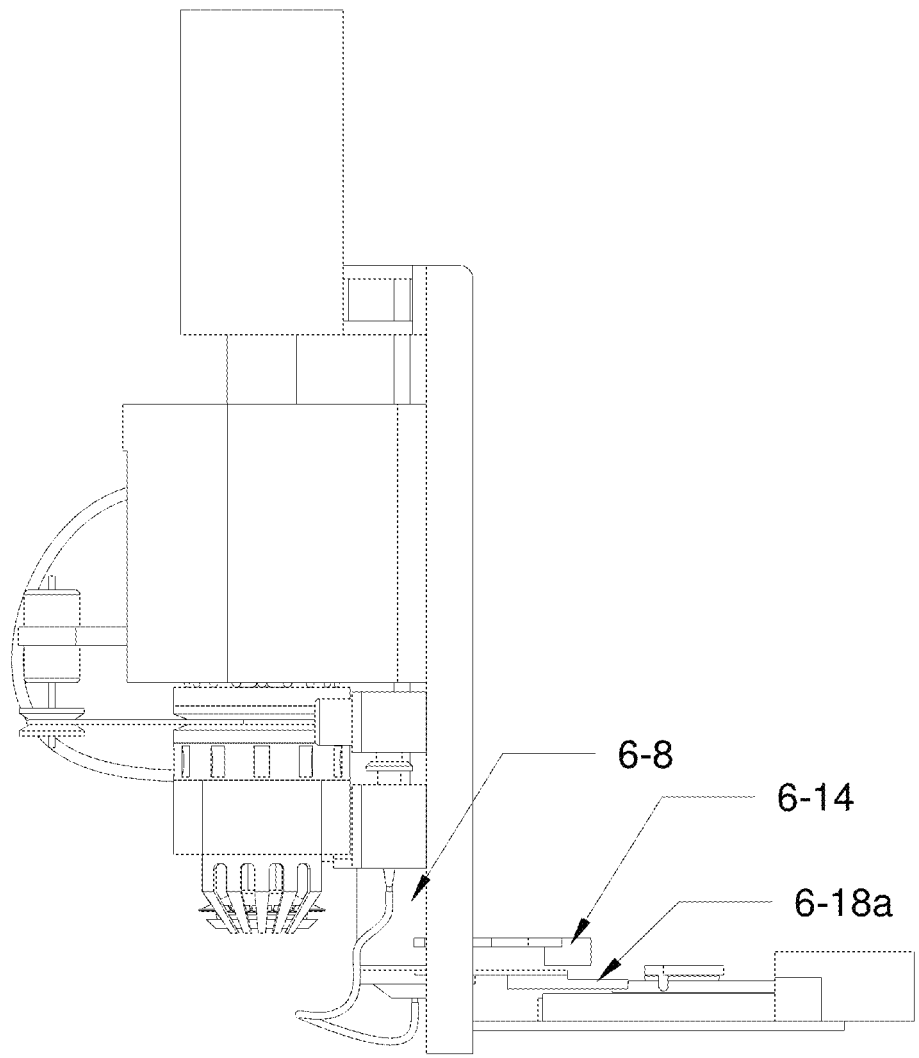
FIG. 14b shows a schematic diagram of a movement member at a second station according to an example of the disclosure.
Figure 19:
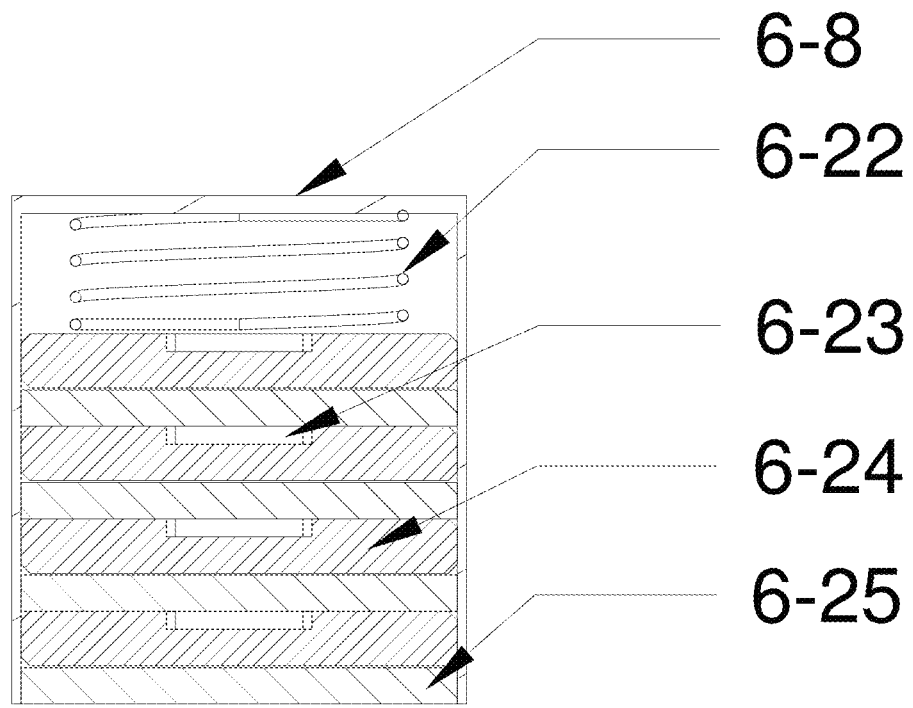
FIG. 19 shows a skin patching material bin according to an example of the disclosure.

A skin patching material bin 6-8 is further arranged on the first support plate 8-4*c*, as shown in FIGS. 12A, 12*b* and 19, and several skin patching materials 6-25 are contained in the skin patching material bin 6-8. A skin patching spacer 6-24 is arranged between two adjacent skin patching materials 6-25, and a first magnetic attraction member 6-23 is arranged on the skin patching spacer 6-24. A skin patching spacer diversion recess 6-18*a* is further provided in the movement member 6-18, a side of the first support plate 8-4*c* is provided with a skin patching spacer magnetic frame 6-14, and the skin patching spacer magnetic frame 6-14 and the first magnetic attraction member 6-23 have opposite magnetism. The skin patching spacer diversion recess 6-18*a* is aligned with the skin patching material bin 6-8 under the condition that the movement member 6-18 is at the first station as shown in FIG. 14*a*, and the skin patching spacer diversion recess 6-18*a* is aligned with the skin patching spacer magnetic frame 6-14 under the condition that the movement member 6-18 is at the second station as shown in FIG. 14*b*.

An elastic turnover diaphragm ring 6-7 is provided above the heating space 6-13*e*, and the elastic turnover diaphragm ring 6-7 is configured to switch the turnover skirt 6-26*b* between the first state and the second state. The elastic turnover diaphragm ring 6-7 includes a ring body 6-7*c*, and an inner wall of the ring body 6-7*c* is provided with a first group of baffle sheets 6-7*a* and a second group of baffle sheets 6-7*b*. A diameter formed by the first group of baffle sheets 6-7*a* is greater than the first diameter, a diameter formed by the second group of baffle sheets 6-7*b* is equal to the second diameter, and the first group of baffle sheets 6-7*a* and the second group of baffle sheets 6-7*b* have greater rigidity than the elastic turnover diaphragm 6-26.

Figure 16A:
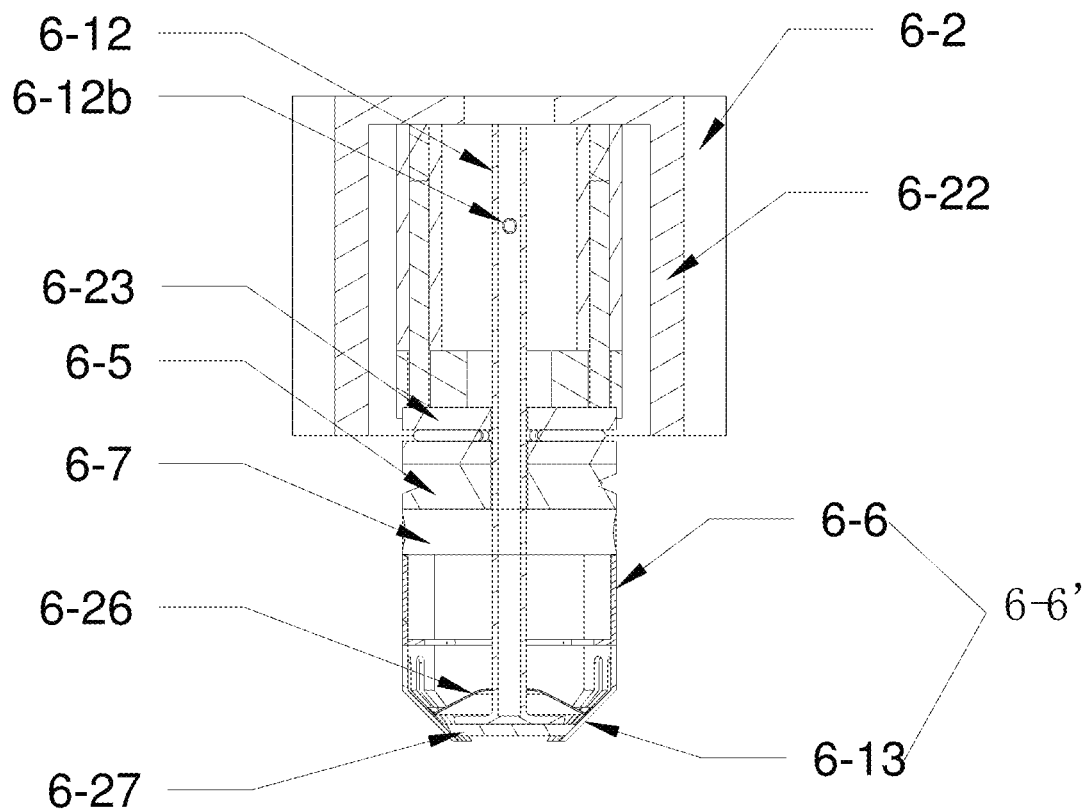
FIG. 16a shows a sectional view I of a skin patching station according to an example of the disclosure.
Figure 16B:
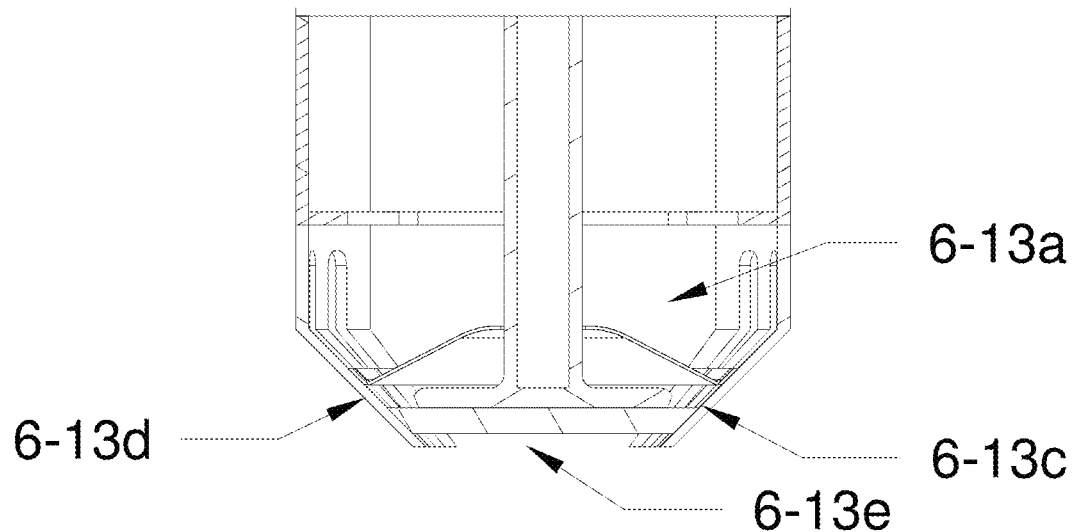
FIG. 16b shows a sectional view II of a skin patching station according to an example of the disclosure.

Specifically, in this example, after the cut position is ground to form the frustum-shaped patching recess 7-13, the frustum-shaped patching recess 7-13 formed needs to be patched, the skin patching station 6 is rotated to be over the mounting position 2-1 by using the rotary operation table 8, as shown in FIGS. 12*a* and 12*b*, and the drive end of the first lifting driving assembly 6-1 moves in the vertical direction. The adsorption assembly 6-11' is mounted at the drive end of the first lifting driving assembly 6-1, and the adsorption assembly 6-11' includes a central vacuum suction arm 6-12 connected to the drive end of the first lifting driving assembly 6-1*a*. A side of the central vacuum suction arm 6-12 is provided with a vacuum pump connection opening 6-12*b*, the vacuum pump connection opening 6-12*b* is connected to a vacuum tube 6-3, the other end of the vacuum tube 6-3 is connected to a first vacuum pump 6-11, and the first vacuum pump 6-11 is configured to perform vacuumizing, so as to make an interior of the central vacuum suction arm 6-12 in a negative pressure environment, and generate a vertical upward adsorption force. An end, far away from the drive end of the first lifting driving assembly 6-1, of the central vacuum suction arm 6-12 is connected to a shaping sheet 6-27, as shown in FIGS. 16*a* and 16*b*, the shaping sheet 6-27 has a shape of a hollowed cone frustum, and a large-diameter end and a small-diameter end of the shaping sheet 6-27 face upwards and downwards respectively. A generatrix slope of the shaping sheet 6-27 is 45°, and at an end, relatively close to the shaping sheet 6-27, of the central vacuum suction arm 6-12 is provided with the elastic turnover diaphragm 6-26 in an interference fit manner. A welding assembly housing 6-2 is further arranged on the first support plate 8-4*c*, a side of the welding assembly housing 6-2 is provided with a first opening, and the first opening is configured to provide a channel for the vacuum tube 6-3. A first mounting block is arranged at a bottom end of an interior of the welding assembly housing 6-2, a servo motor support frame 6-4 is arranged on the first mounting block, and an end of the servo motor support frame 6-4 extends outside from the first opening. A welding mechanism servo motor 6-9 is arranged on the servo motor support frame 6-4, a drive end of the welding mechanism servo motor 6-9 is connected to a welding mechanism servo motor speed reducer 6-10, an end of the first mounting block is connected to a welding mechanism bearing 6-5, the welding mechanism bearing 6-5 is connected to the welding mechanism servo motor speed reducer 6-10 through belt transmission, and a heating assembly 6-6' is connected to a bottom end of the welding mechanism bearing 6-5. When the welding mechanism servo motor 6-9 rotates, the heating assembly 6-6' also rotates simultaneously. The heating assembly 6-6' includes heating units 6-6 that are fixedly connected to the bottom end of the welding mechanism bearing 6-5 and are distributed in a circular ring shape, and a plurality of elastic reeds 6-13 are connected to a bottom end of the heating unit 6-6. Specifically, the plurality of elastic reeds 6-13 may be connected through the ring body 6-7*c*, the plurality of elastic reeds 6-13 are evenly distributed on the same circumference at equal intervals around an axial direction of the heating unit 6-6, and joint form the accommodation space 6-13*a*, and the heating units 6-6 are configured to heat the plurality of elastic reeds 6-13 together. In this example, two elastic reeds 6-13 are provided, free ends of the elastic reeds 6-13 are heating portions 6-13*b*, and the heating portions 6-13*b* are bent towards the interior of the accommodation space 6-13*a*, to form the frustum-shaped heating space 6-13*e*. The taper of the heating space 6-13*e* is equal to the taper of the patching recess 7-13, and is 45°, and the heating portion 6-13*b* has the first heating surface 6-13*c* and the second heating surface 6-13*d*. The first heating surface 6-13*c* is configured to shape and heat the skin patching material 6-25 placed in the heating space 6-13*e*, and the second heating surface 6-13*d* is configured to heat an inner wall of the patching recess 7-13.

Figure 13:
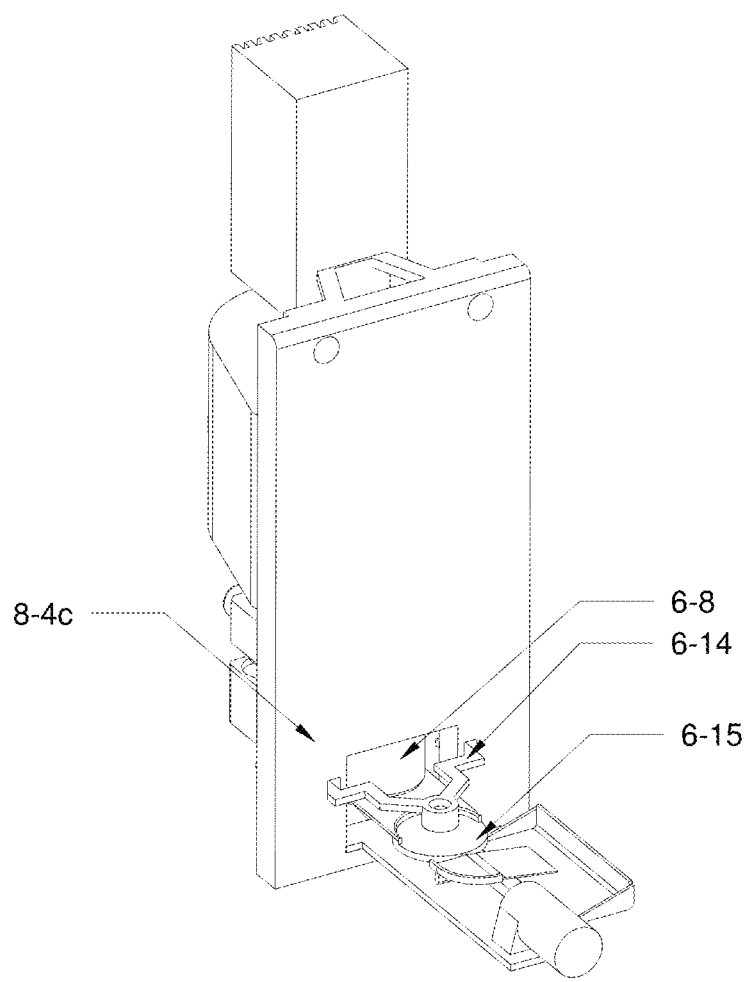
FIG. 13 shows a rear view of a skin patching station apparatus according to an example of the disclosure.
Figure 15:
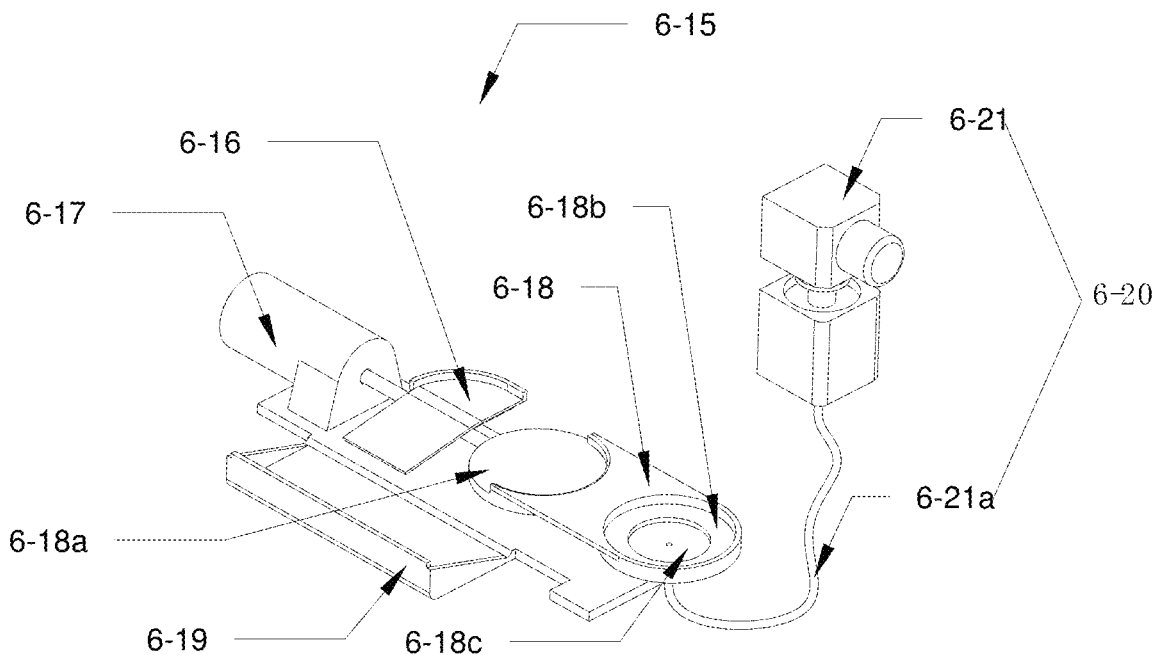
FIG. 15 shows a skin patching allocating assembly according to an example of the disclosure.

A surface, relatively far away from the first lifting driving assembly 6-1, of the first support plate 8-4*c* is provided with the skin patching allocating assembly 6-15. As shown in FIGS. 13 and 15, a first square hole extending in a horizontal direction is provided below the first support plate 8-4*c*, the skin patch allocating assembly 6-15 includes a first mounting plate arranged in the first square hole, the movement member 6-18 that is movable in the horizontal direction is slidably arranged on the first mounting plate, and a skin supplementary material allocating direct-acting motor 6-17 that drives the movement member 6-18 to move is also arranged on the first mounting plate. A skin patching containment recess 6-18*b* is provided in the movement member 6-18, and a bottom of the skin patching containment recess 6-18*b* is provided with a skin patch glue containment recess 6-18*c*. A glue injection assembly 6-20 is further arranged on the first support plate 8-4*c*, the glue injection assembly 6-20 includes a glue injection direct-acting pump 6-21, an output end of the glue injection direct-acting pump 6-21 is connected to a glue delivery tube 6-21*a*, and an end of the glue delivery tube 6-21*a* is in communication with the skin patching glue containment recess 6-18*c*, so as to deliver the glue into the skin patching glue containment recess 6-18*c*. A skin patching spacer diversion recess 6-18*a* is further provided in the movement member 6-18, and the skin patching spacer diversion recess 6-18*a* and the skin patching containment recess 6-18*b* are arranged in the horizontal direction.

A skin patching material bin 6-8 is further arranged on the first support plate 8-4*c*, as shown in FIGS. 12*a*, 12*b*, 13 and 19, multiple skin patch materials 6-25 are contained inside the skin patching material bin 6-8, and the skin patching spacers 6-24 are arranged between every two adjacent skin patching materials 6-25. A skin patching material bin release spring 6-22 that is stretchable and retractable in the vertical direction is arranged at a top end of the skin patching material bin 6-8, the other end of the skin patching material bin release spring 6-22 abuts against the skin patching spacer 6-24, and the skin patching material bin release spring 6-22 is configured to push the skin patching material 6-25 in the skin patching material bin 6-8 and the skin patching spacer 6-24 to move downwards.

The movement member 6-18 has a first station and a second station. Under the condition that the movement member 6-18 is at the first station, the skin patching containment recess 6-18*b* and the skin patching glue containment recess 6-18*c* are both located under the adsorption assembly 6-11', and the skin patching spacer diversion recess 6-18*a* is located below the skin patching material bin 6-8, to contain the skin patching spacer 6-24. Under the condition that the movement member is at the second station, the skin patching containment recess 6-18*b* and the skin patching glue containment recess 6-18*c* are located below the skin patching material bin 6-8, to contain the skin patching material 6-25.

A skin patching spacer magnetic frame 6-14 is further arranged on the first support plate 8-4*c*, as shown in FIG. 14, a first magnetic attraction member 6-23 is arranged on each skin patching spacer 6-24, and the skin patching spacer magnetic frame 6-14 and the first magnetic attraction member 6-23 have opposite magnetism. Under the condition that the movement member 6-18 is at the second station, the skin patching spacer diversion recess 6-18*a* is located under the skin patching spacer magnetic frame 6-14, such that the skin patching spacer 6-24 in the skin patching spacer diversion recess 6-18*a* is sucked up.

A skin patching spacer stopper member 6-16 is further arranged on the movement member 6-18, the skin patching spacer stopper member 6-16 has a partially protruding scraping portion, and a skin patching spacer recovery bin 6-19 is further provided at a side surface of the first mounting plate. The skin patching spacer stopper member 6-16 is configured to scrape the skin patching spacer 6-24 that is adsorbed to the skin patching spacer magnetic frame 6-14 into the skin patching spacer recovery bin 6-19.

During use, under the condition that the movement member 6-18 moves from the first station to the second station, the skin patching spacer magnetic frame 6-14 sucks up the skin patching spacer 6-24 located in the skin patching spacer diversion recess 6-18*a*. When the movement member 6-18 moves from the second station to the first station, the skin patching spacer stopper member 6-16 scrapes into the skin patching spacer recovery bin 6-19 the skin patching spacer 6-24 that is sucked up.

Figure 17:
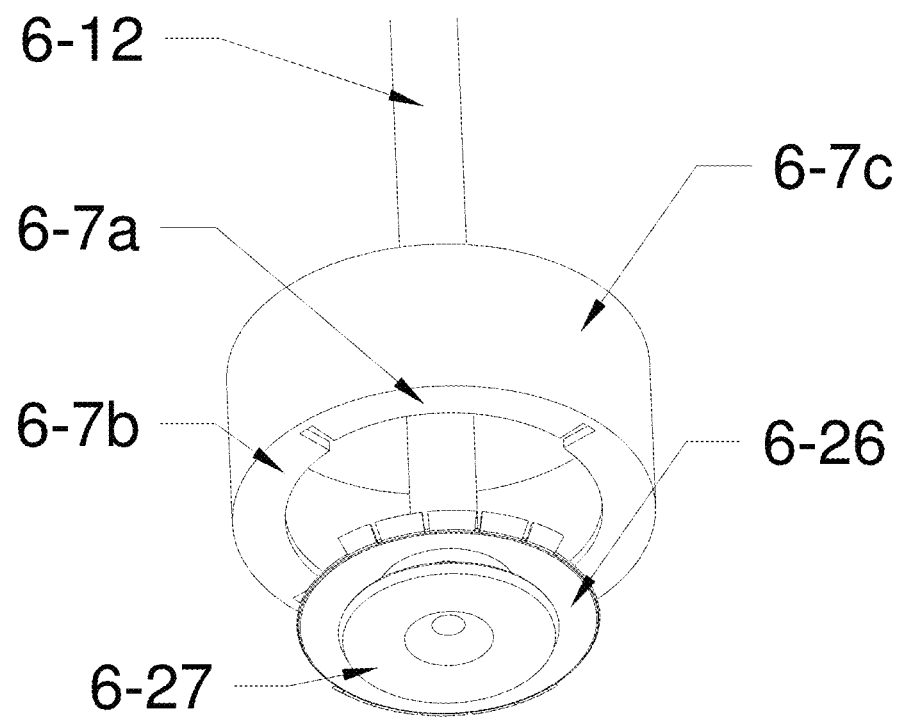
FIG. 17 shows an elastic turnover diaphragm ring according to an example of the disclosure.
Figure 18:
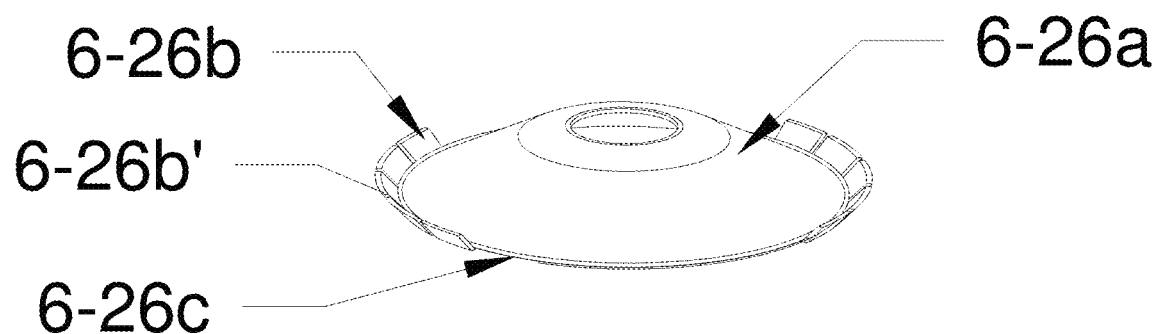
FIG. 18 shows an elastic turnover diaphragm according to an example of the disclosure.

As shown in FIG. 17 and FIG. 18, the elastic turnover diaphragm 6-26 includes the turnover diaphragm body 6-26*a*, the turnover center ring 6-26*c* is arranged at the periphery of the turnover diaphragm body 6-26*a*, and an outer edge of the turnover center ring 6-26*c* is provided with multiple turnover skirts 6-26*b*. The multiple turnover skirts 6-26*b* are symmetrically arranged, and the multiple turnover skirts 6-26*b* jointly form the first circular ring 6-26*b'*. The turnover skirt 6-26*b* has the first state and the second state. When the turnover skirt is in the first state, an included angle between each of the turnover skirt 6-26*b* and the horizontal plane is 0°, and an outer diameter of the first circular ring 6-26*b'* is the first diameter. When the turnover skirt is in the second state, each of the turnover skirts 6-26*b* turns upwards and forms an angle of 45° with the horizontal plane, an outer diameter of the first circular ring 6-26*b'* is the second diameter, and the first diameter is greater than the second diameter. FIG. 18 is a schematic structural diagram of the first circular ring 6-26*b'* in the second state, and the elastic turnover diaphragm ring 6-7 is arranged at a bottom of the heating unit 6-6, as shown in FIG. 17. The elastic turnover diaphragm ring 6-7 is configured to switch the turnover skirt 6-26*b* between the first state and the second state, the elastic turnover diaphragm ring 6-7 includes the ring body 6-7*c*, and the inner wall of the ring body 6-7*c* is provided with the first group of baffle sheets 6-7*a* and the second group of baffle sheets 6-7*b*. The first group of baffle sheets 6-7*a* include two first baffle sheets, and the second group of baffle sheets 6-7*b* include two second baffle sheets. The two first baffle sheets and the two second baffle sheets are arranged at intervals, a free end of each baffle is cambered, the free ends of the two first baffle sheets are located on the same circumference with a diameter greater than the first diameter, the free ends of the two second baffle sheets are located on the same circumference with a diameter equal to the second diameter, and the first group of baffle sheets 6-7*a* and the second group of baffle sheets 6-7*b* have greater rigidity than the elastic turnover diaphragm 6-26.

During use, when the first frustum-shaped patching recess 7-13 needs to be patched, the glue injection assembly 6-20 delivers the glue into the skin patching glue containment recess 6-18*c*. After the glue is delivered, the drive end of the skin supplementary material allocating direct-acting motor 6-17 pushes the movement member 6-18 to move, and causes the movement member 6-18 to be located at the second position, the skin patching containment recess 6-18*b* and the skin patching glue containment recess 6-18*c* are located under the skin patching material bin 6-8, the skin patching material 6-25 in the skin patching material bin 6-8 falls into the skin patching containment recess 6-18*b* under the action of the skin patching material bin release spring 6-22, and a portion, not in contact with the skin patching containment recess 6-18*b*, of the skin patching material 6-25 comes into contact with the glue in the skin patching glue containment recess 6-18*c*, that is, the skin patching material 6-25 that has one surface coated with the glue is formed. A thickness of the patching material 6-25 is 2 mm, and a distance between a lower end of the skin patching material bin 6-8 and an upper bearing surface of the skin patching glue containment recess 6-18*c* is 2 mm, such that it can be guaranteed that merely the skin patching material 6-25 other than the skin patching spacer 6-24 in the skin patching material bin 6-8 can be taken away when the movement member 6-18 is switched to the first position from the second station. When the movement member 6-18 is switched from the second station to the first station, the skin patching spacer 6-24 falls into the skin patching spacer diversion recess 6-18*a* under the action of magnet attraction, and a height of the skin patching spacer 6-24 is equal to a height of the skin patching spacer diversion recess 6-18*a* in order to prevent a next skin patching material 6-25 from getting out of the skin patching material bin 6-8. Particularly, in this example, the thickness of the skin patching spacer 6-24 is 3 mm, and the height of the skin patching spacer diversion recess 6-18*a* is 3 mm. Since a distance between an axis of a circle defined by the elastic reeds 6-13 and a central axis of the skin patching material bin 6-8 is equal to a distance between the central axis of the skin patching material bin 6-8 and a central axis of the skin patching spacer diversion recess 6-18*a*, the skin patching material 6-25 runs to be under the elastic reed 6-13 when the skin patching spacer 6-24 falls into the skin patching spacer diversion recess 6-18*a*.

In this case, the movement member 6-18 is switched from the second station to the first station. When the movement member is at the first station, the skin patching containment recess 6-18*b* and the skin patching glue containment recess 6-18*c* are under the adsorption assembly 6-11'. Since a diameter of the circular ring formed by the free ends of the elastic reeds 6-13 is 20 mm, and a diameter of the skin patching material 6-25 is 24 mm, it is necessary to use the elastic turnover diaphragm 6-26 to expand a circumference formed by the heating portions 6-13*b* of the elastic reed 6-13. The first lifting driving assembly 6-1 is turned on, and drives the adsorption assembly 6-11' to move in a direction close to the skin patching containment recess 6-18*b*, the first vacuum pump 6-11 and the heating unit 6-6 are turned on simultaneously, the turnover skirts 6-26*b* are in the first state when the adsorption assembly 6-11 moves downwards, and expand the diameter of the circular ring formed by the free ends of the elastic reed 6-13 to the first diameter of 32 mm, then the adsorption assembly 6-11' continues moving downwards until the skin patching material 6-25 is sucked out of the skin patching glue containment recess 6-18*c* by the adsorption assembly 6-11', and the skin patching material 6-25 is attached to the shaping sheet 6-27 in this case. After sucking, the drive end of the first lifting driving assembly 6-1 drives the skin patching material 6-25 to move in the opposite direction, and transports the skin patching material 6-25 into the accommodation space 6-13*a*. During transportation, since the diameter of the circumference formed by the heating portions 6-13*b* of the elastic reed 6-13 is greater than the diameter of the skin patching material 6-25, the skin patching material 6-25 can smoothly enter the accommodation space 6-13*a*. During a process of the skin patching material 6-25 entering the accommodation space 6-13*a*, the turnover skirt 6-26*b* at the periphery of the elastic turnover diaphragm 6-26 is still in the first state, the heating portion 6-13*b* of the elastic reed 6-13 cannot heat the skin patching material 6-25 due to a failure to be attached to the skin patching material 6-25, the drive end of the first lifting driving assembly 6-1 continues driving the elastic reed 6-13 into the elastic turnover diaphragm ring 6-7 accordingly, and a reversing space is formed inside the elastic turnover diaphragm ring 6-7, as shown in FIG. 17. The turnover skirt 6-26*b* in the first state directly corresponds to the first group of baffle sheets 6-7*a*, a formed diameter being 34 mm of the first group of baffle sheets 6-7*a* is greater than the first diameter of 32 mm, and the turnover skirt 6-26*b* in the first state can smoothly enter into the reversing space. Then, the welding mechanism servo motor 6-9 is turned on, to rotate the elastic turnover diaphragm ring 6-7, and further cause the second group of baffle sheets 6-7*b* correspond to the turnover skirt 6-26*b* to be in the first state, and then the first lifting driving assembly 6-1 is controlled to drive the adsorption assembly 6-11' to drive the skin patching material 6-25 to move downwards. During the downward movement, the turnover skirt 6-26*b* in the first state is switched from the first state to the second state under the action of baffling of the second group of baffle sheets 6-7*b*, and the turnover skirt 6-26*b* is switched to the second diameter from the first diameter, and reach the second state. The adsorption assembly 6-11' keeps moving downwards, the welding mechanism servo motor 6-9 is turned on, and the heating assembly 6-6' keeps rotating continuously, the first heating surface 6-13*c* is attached to the skin patch material 6-25 in this case, so as to heat and shape the skin patch material 6-25, and the spatial position of the mounting position 2-1 is adjusted to drive the chest skin to move vertically upwards. Since the thickness of the heating portion 6-13*b* of the elastic reed 6-13 is 1 mm, it is necessary to guarantee that a lower end of the skin patching material 6-25 in the accommodation space 6-13*a* has a distance of 1 mm from a lower end of the elastic reed 6-13 (that is, the skin patching material 6-25 is above the elastic reed 6-13). If a lower end of the skin patching material 6-25 is flush with a lower end of the elastic reed 6-13, a large diameter of the frustum-shaped patching recess 7-13 is expanded in size. Thus, in order to guarantee that the size of the large diameter of the frustum-shaped patching recess 7-13 keeps unchanged, the distance between the lower end of the skin patching material 6-25 in the accommodation space 6-13*a* and the lower end of the elastic reed 6-13 should be reserved by 1 mm. Since the heating portion 6-13*b* of the elastic reed 6-13 extends into the gate by 2 mm, that is, a vertical height of the frustum-shaped patching recess 7-13 is 2 mm, it can be guaranteed that the skin of the gate and the skin patching material 6-25 simultaneously form cone frustums that have upper bottom surface diameters of 24 mm, lower bottom surface diameters of 20 mm, and a generatrix slope 45°. The gate and the skin patching material 6-25 are simultaneously heated, and then the skin patching material 6-25 is rotated and molten at a high temperature for 10 s by the heating portion 6-13*b*, then the mounting position 2-1 is adjusted in spatial position immediately, so as to drive the chest skin to move vertically downwards away from the heating portion 6-13*b*, and then the drive end 6-1*a* of the first lifting driving assembly 6-1 drives the skin patch material 6-25 that is heated and shaped into a frustum shape to move in a direction (that is, upward) away from the patching recess 7-13. In a process of upward movement, the turnover skirt 6-26*b* in the second state is switched from the second state to the first state under the action of baffling of the second group of baffle sheets 6-7*b*, and the second diameter of the turnover skirt 6-26*b* is switched to the first diameter. Then, the first lifting driving assembly 6-1 drives the skin patching material 6-25 to move in a direction close to the frustum-shaped patching recess 7-13. During movement, the turnover skirt in the first state expands a diameter of a circular ring that is formed by the free ends of the elastic reeds 6-13 to the first diameter, and in this way, the skin patching material 6-25 shaped can be transported from the accommodation space 6-13*a* into the frustum-shaped patching recess 7-13 heated. When an upper surface of the skin patching material 6-25 overlaps an upper surface of a skin layer of the frustum-shaped patching recess 7-13, the adsorption assembly 6-11' keeps at a current position 20 s, the skin patching material 6-25 molten and the frustum-shaped patching recess 7-13 molten are fully bonded and cooled, the first vacuum pump 6-11 is turned off, the adsorption assembly 6-11' releases the skin patching material 6-25, the skin patching station 6 is resumed to an initial state, and a circle of skin layer supplementary material welding process is completed.

In a process of resetting, as shown in FIGS. 13 and 15, the drive end of the skin supplementary material allocating direct-acting motor 6-17 resumes the movement member 6-18 to the first station from the second station. In a process of resuming to the first station, the skin patching spacer 6-24 in the skin patching spacer diversion recess 6-18*a* is gradually transported to a position below the skin patching spacer magnetic frame 6-14. Since the skin patching spacer magnetic frame 6-14 and the first magnetic attraction member 6-23 have opposite magnetism, the skin patching spacer magnetic frame 6-14 can suck up the skin patching spacer 6-24, then the skin patching spacer 6-24 on the skin patching spacer magnetic frame 6-14 is scraped into the skin patching spacer recovery bin 6-19 by the scraping portion on the skin patching spacer stopper member 6-16, and recovery by the skin patching spacer recovery bin 6-19 is completed.

The apparatus simultaneously heats the frustum-shaped patching recess 7-13 and the skin patching material 6-25, and the skin patching material 6-25 is heated into a frustum shape. Slopes of the frustum-shaped patching recess 7-13 and the skin patching material 6-25 are both 45 degrees, and then the skin patching material 6-25 is put into the frustum-shaped patching recess 7-13, such that a contact area between the skin patching material and the frustum-shaped patching recess can be expanded and a binding strength can be enhanced. The state change of the turnover skirt 6-26b on the elastic turnover diaphragm 6-26 can effectively prevent the skin patching material 6-25 from being damaged during transportation of the skin patching material 6-25 into the accommodation space 6-13a and upward movement.

Further, the removal station 5 includes a fourth support plate 8-4d, a fourth lifting driving assembly 5-1 is arranged on the fourth support plate 8-4d, and a working platform 5-5 is mounted at a drive end 5-2 of the fourth lifting driving assembly 5-1. An assembly rotation motor 5-4 is arranged on the working platform 5-5, a removal assembly 5-10' is mounted at a drive end 5-4a of the assembly rotation motor 5-4, and the removal assembly 5-10' includes a trimming cutter head 5-10. The trimming cutter head 5-10 rotates around a second axis, and the second axis extends in a vertical direction.

Figure 20:
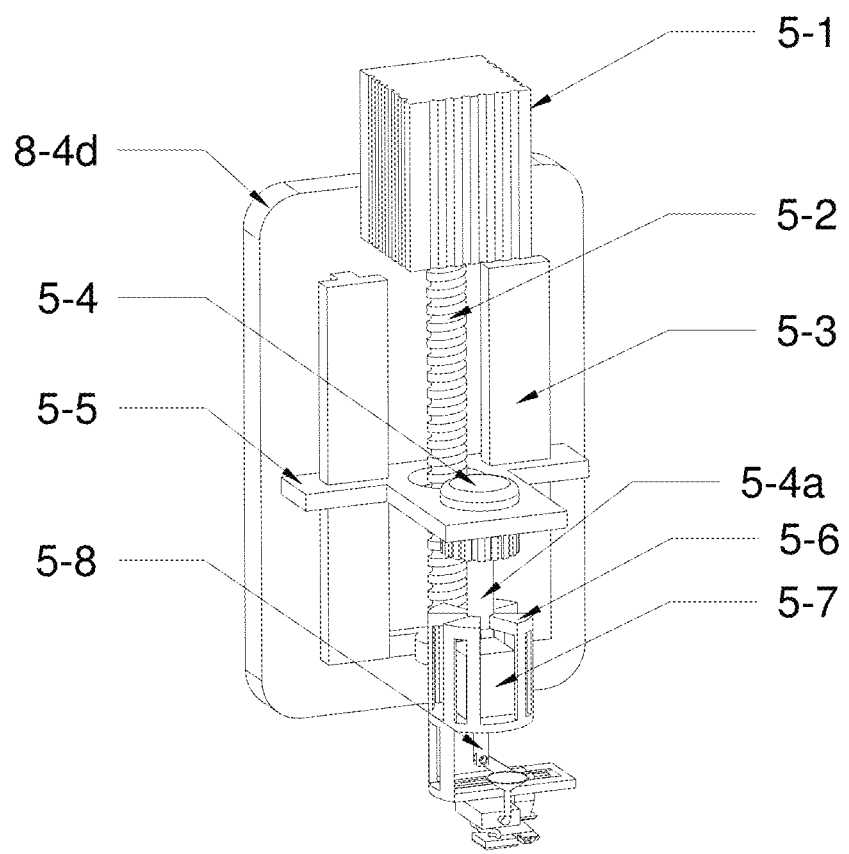
FIG. 20 shows a removal station according to an example of the disclosure.
Figure 21:
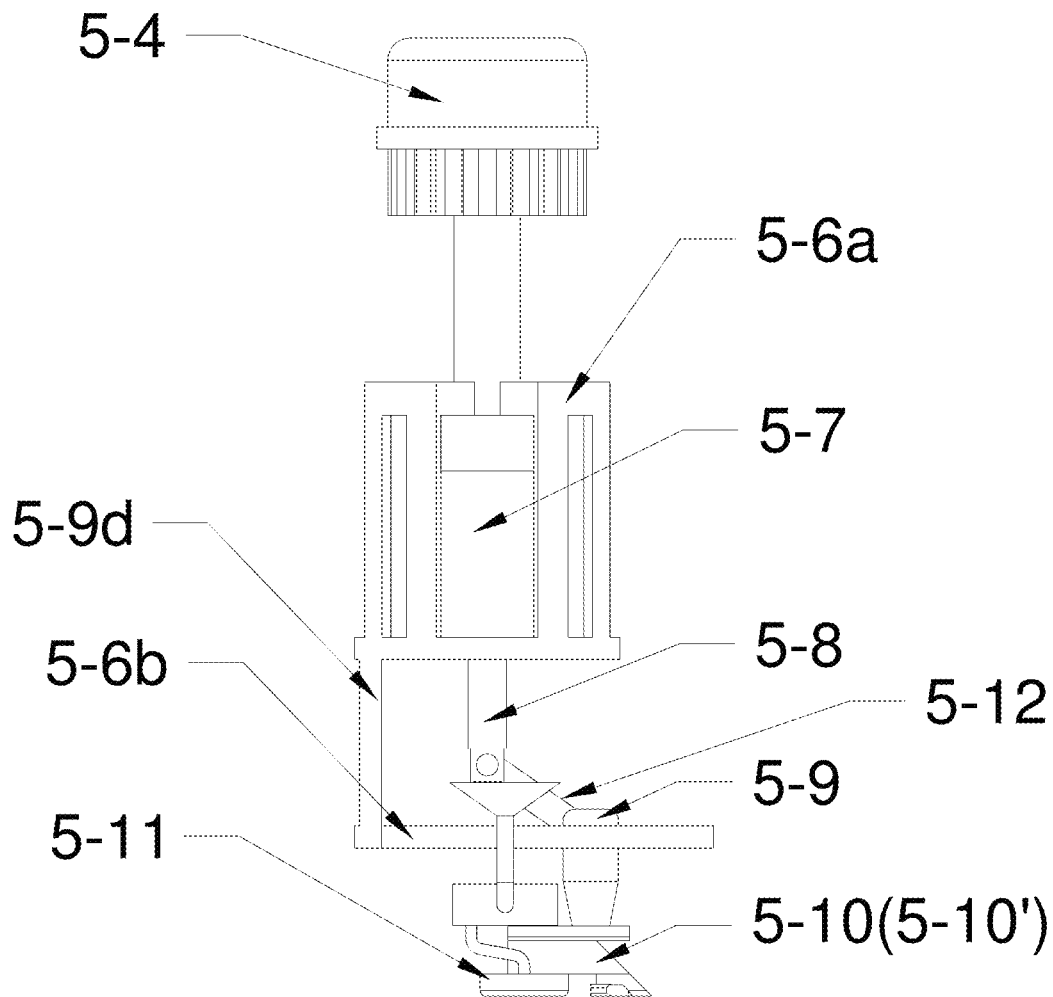
FIG. 21 shows a sectional view of a removal station according to an example of the disclosure.
Figure 22:
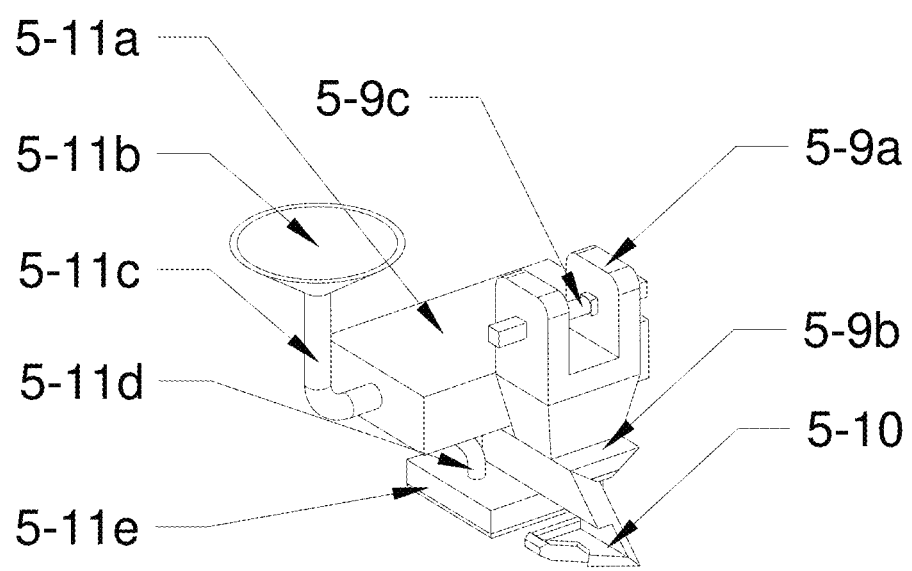
FIG. 22 shows a trimming cutter head and a skin surface cleaning mechanism according to an example of the disclosure.
Figure 24:
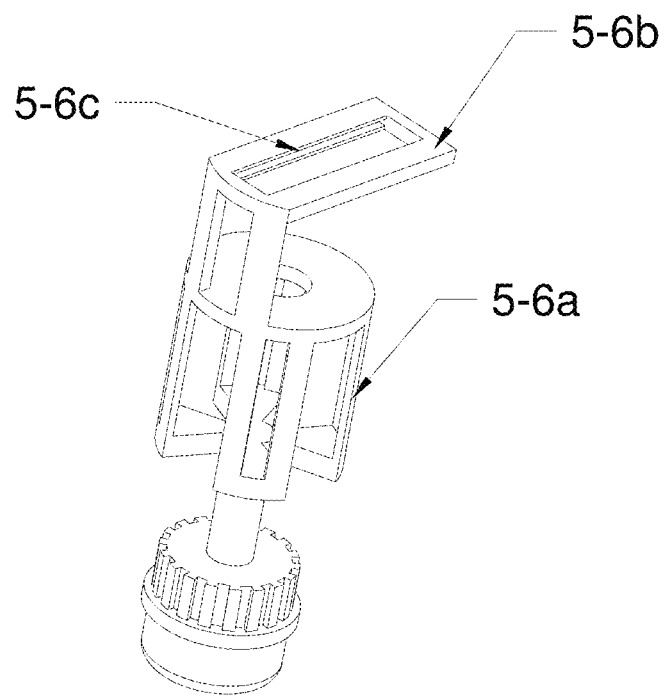
FIG. 24 shows a schematic diagram of a cutting mechanism slide rail according to an example of the disclosure.

Specifically, in this example, after the frustum-shaped patching recess 7-13 is filled with the skin patch material 6-25, the skin patching material is extruded and solidified on the surface of the skin layer after being cooled since the frustum-shaped patching recess 7-13 and the skin patch material 6-25 are both in a state of heating and melting. Thus, it is necessary to remove the residual material solidified on the surface of the skin layer. The removal station 5 is rotated to be over the mounting position 2-1 by using the rotary operation table 8, and then the residual material at the skin patching position is removed by the removal station 5, as shown in FIG. 20. The drive end 5-2 of the fourth lifting driving assembly 5-1 is connected to a screw, the working platform 5-5 is slidably arranged on the fourth supporting plate 8-4d in the vertical direction, and the screw is in threaded connection to the working platform 5-5, and is configured to drive the working platform 5-5 to move in the vertical direction. The working platform 5-5 is T-shaped and has a transverse portion and a vertical portion. A side, relatively close to the fourth support plate 8-4d, of the transverse portion is provided with the chute 5-6c. Two translation rails 5-3 extending in the vertical direction are arranged in the fourth support plate 8-4d, and the chute 5-6c is slidably connected to the translation rails 5-3. The assembly rotation motor 5-4 is arranged on the vertical portion, the drive end of the assembly rotation motor 5-4 can rotate around the second axis, and the second axis extends in the vertical direction. The removal assembly 5-10' is mounted on the drive end 5-4a of the assembly rotation motor 5-4, the removal assembly 5-10' includes a cage motor support 5-6 mounted at the drive end 5-4a of the assembly rotation motor, a mounting space is formed in the cage motor support 5-6, as shown in FIG. 21, a direct-acting motor 5-7 is arranged in the mounting space, a drive end of the direct-acting motor 5-7 is connected to a direct-acting motor push rod 5-8, the other end of the direct-acting motor push rod 5-8 is hinged to a first connection rod 5-12, and the other end of the first connection rod 5-12 is hinged to a cutter holder connection assembly 5-9, as shown in FIG. 22. The cutter holder connection assembly 5-9 includes a cutter holder 5-9b and a first translation frame mounted on the cutter holder 5-9b, the first translation frame includes a U-shaped translation member 5-9a and a first hinge rod 5-9c, the first hinge rod 5-9c is fixedly connected to the U-shaped translation member 5-9a, and two ends of the first hinge rod extend out of the U-shaped translation member 5-9a. The first connection rod 5-12 is hinged to a middle of the first hinge rod 5-9c. The trimming cutter head 5-10 is mounted on the cutter holder 5-9b, the trimming cutter head 5-10 includes a trimming portion and a connection portion, the connection portion is configured to be connected to the cutter holder 5-9b, and the trimming portion and the connection portion form a V shape. The cage motor support 5-6 includes a direct-acting motor support 5-6a for holding the direct-acting motor 5-7, a cutting mechanism slide rail 5-6b arranged below the direct-acting motor support 5-6a, and a second connection rod 5-9d for connecting the direct-acting motor support 5-6a to the cutting mechanism slide rail 5-6b, as shown in FIG. 24. The cutting mechanism slide rail 5-6b is recessed inwards to form the chute 5-6c, the chute 5-6c extends in the horizontal direction, and the chute 5-6c is slidably connected to the two ends, extending out of the U-shaped translation member 5-9a, of the first hinge rod 5-9c. The cutter holder connection assembly 5-9 can slide in the sliding rail 5-6b of the cutting mechanism in its extension direction, and since the direct-acting motor push rod 5-8 is hinged to the first connection rod 5-12 and the other end of the first connection rod 5-12 is connected to the cutter holder connection assembly 5-9, a position of the cutter holder connection assembly 5-9 in the cutting mechanism slide rail 5-6b can be changed under the drive of the direct-acting motor 5-7.

A skin surface cleaning mechanism 5-11 is further arranged below the cutting mechanism slide rail 5-6b, and the skin surface cleaning mechanism 5-11 includes a high-density foam 5-11e arranged below the connection portion of the trimming cutter head 5-10, as shown in FIG. 22. A bottom surface of the high-density foam 5-11e is at the same horizontal plane with the trimming portion of the trimming cutter head 5-10. A top surface of the high-density foam 5-11e is provided with a solution permeation tube 5-11d, the other end of the solution permeation tube 5-11d is connected to a butanone solution tank 5-11a, and the butanone solution tank 5-11a is fixed to the cutter holder connection assembly 5-9. A butanone solution filling tube 5-11c is provided in a side of the butanone solution tank 5-11a, and a butanone solution filling opening 5-11b for filling a butanol solution is provided in the other end of the butanone solution filling tube 5-11c.

In a use process, the removal station 5 is rotated to be over the mounting position 2-1 by the rotary operation table 8, and an axis of the cage motor support 5-6 coincides with an axis of the frustum-shaped patching recess 7-13. Then, the fourth lifting driving assembly 5-1 is turned on to cause the working platform 5-5 to move in the negative direction of the z axis along the translation rail 5-3. When a bottom surface of the trimming cutter head 5-10 comes into the skin patching material 6-25, the direct-acting motor 5-7 is turned on to cause the direct-acting motor push rod 5-8 to drive the cutter holder connection assembly 5-9 to move radially along a surface of the skin layer patched until a tip of the trimming cutter head 5-10 penetrates a joint line (the joint line between the skin patching material 6-25 and the chest skin) on the surface of the skin layer, that is, the tip of the trimming cutter head 5-10 is located with a distance of 12 mm from a center of circle of the skin patching material 6-25 bonded. Then, the assembly rotation motor 5-4 is turned on to drive the cage motor support 5-6 and all lower components to move circumferentially around the axis of the cage motor support 5-6, and the trimming cutter head 5-10 produces an annular cutting effect of an edge of the skin patching material 6-25. When the assembly rotation motor 5-4 rotates through a circle, the direct-acting motor 5-7 is turned on, the direct-acting motor 5-7 pushes the direct-acting motor push rod 5-8 to move downwards continuously, and the cutter holder connection assembly 5-9 moves in the horizontal direction, thus driving the high-density foam 5-11e to move correspondingly, and moving the high-density foam 5-11e to the joint line. The butanone solution is transported to the high-density foam 5-11e through the butanone solution tank 5-11a and the solution permeation tube 5-11d, and the assembly rotating motor 5-4 continues to run for 720°, such that the high-density foam 5-11e can effectively clean and grind the joint line. The removal station can annularly cut the residual material of the joint line, and wipe the joint line with an organic solvent after annular cutting, thus effectively improving aesthetics of a dummy skin 01 sample after skin patching.

Specific examples are used herein to explain the principles and embodiments of the disclosure. The foregoing description of the examples is merely intended to help understand the method of the disclosure and its core ideas. The above embodiments are merely preferred embodiments of the disclosure. It should be noted that since words are limited in expression and infinite specific structures exist objectively, those skilled in the art can make several improvements, embellishments or changes, or appropriately combine the above technical features without departing from the principles of the disclosure. These improvements, embellishments, changes or combinations, or direct applications of the inventive concept and technical solutions to other scenarios without improvements should be regarded within the protection scope of the disclosure.

What is claimed is:

1. A skin manufacturing post-treatment device for an automobile collision dummy, comprising:
    a base, wherein the base has a mounting surface;
    an adjustment mechanism, wherein the adjustment mechanism is mounted on the mounting surface and has a mounting position for a dummy skin to be mounted, and a spatial position of the mounting position is adjustable; and the dummy skin is made through an injection molding process; and
    a post-treatment mechanism, wherein post-treatment mechanism is mounted on the mounting surface and located at a side of the adjustment mechanism, and the post-treatment mechanism comprises a rotary operation table; a cutting station, a grinding station, a skin patching station and a removal station are sequentially arranged on the rotary operation table in a circumferential direction, and the rotary operation table is configured to place the stations over the mounting position in turn; the cutting station is configured to cut an injection molding residual material on a surface of the dummy skin, the grinding station is configured to grind a cut position to form a frustum-shaped patching recess, and an opening end of the patching recess is a large-diameter end; and the skin patching station is configured to fill the patching recess with a welding skin patching material, and the removal station is configured to clean a skin patching position;
    wherein the skin patching station comprises: a first support plate, and a skin patching allocating assembly, a first lifting driving assembly and a heating assembly are mounted on the first support plate; the skin patching allocating assembly is configured to provide a skin patching material that has a surface coated with a glue, a drive end of the first lifting driving assembly is provided with an adsorption assembly, and the adsorption assembly is configured to adsorb and release the skin patching material; the heating assembly comprises a heating unit and a plurality of elastic reeds connected to the heating unit, the heating unit is configured to heat the elastic reeds, and the plurality of elastic reeds are distributed on the same circumference, and jointly define an accommodation space; the drive end of the first lifting driving assembly is located in the accommodation space, free ends of the elastic reeds are heating portions, the heating portions are bent towards an interior of the accommodation space to form a frustum-shaped heating space, and a taper of the heating space is equal to a taper of the patching recess; and the heating portion has a first heating surface facing the heating space and a second heating surface facing away from the heating space, the first heating surface is configured to shape and heat the skin patching material placed in the heating space, and the second heating surface is configured to heat an inner wall of the patching recess.

2. The skin manufacturing post-treatment device for the automobile collision dummy according to claim 1, wherein an elastic turnover diaphragm is further mounted between the drive end of the first lifting driving assembly and the adsorption assembly, and the elastic turnover diaphragm comprises a turnover diaphragm body; a turnover center ring is arranged at the periphery of the turnover diaphragm body, an outer edge of the turnover center ring is provided with multiple turnover skirts, and the multiple turnover skirts jointly form a first circular ring; and the turnover skirt has a first state and a second state, the first circular ring has a first diameter under the condition that the turnover skirt is in the first state, the first circular ring has a second diameter under the condition the turnover skirt is in the second state, and the first diameter is greater than the second diameter.

3. The skin manufacturing post-treatment device for the automobile collision dummy according to claim 2, wherein an elastic turnover diaphragm ring is provided above the heating space, and the elastic turnover diaphragm ring is configured to switch the turnover skirt between the first state and the second state; the elastic turnover diaphragm ring comprises a ring body, and an inner wall of the ring body is provided with a first group of baffle sheets and a second group of baffle sheets; and a diameter formed by the first group of baffle sheets is greater than the first diameter, a diameter formed by the second group of baffle sheets is equal to the second diameter, and the first group of baffle sheets and the second group of baffle sheets have greater rigidity than the elastic turnover diaphragm.

4. The skin manufacturing post-treatment device for the automobile collision dummy according to claim 1, wherein the skin patching allocating assembly comprises a movement member; a skin patching containment recess is provided in the movement member, and a bottom of the skin patching containment recess is provided with a skin patching glue containment recess; and a glue injection assembly is further provided on the first support plate, and the glue injection assembly is configured to inject the glue into the skin patching glue containment recess; and the movement member has a first station and a second station, the skin patching containment recess and the skin patching glue containment recess are located under the adsorption assembly under the condition that the movement member is in the first station, and the skin patching containment recess and the skin patching glue containment recess are misaligned with the adsorption assembly under the condition that the movement member is at the second station.

5. The skin manufacturing post-treatment device for the automobile collision dummy according to claim 4, wherein a skin patching material bin is further arranged on the first support plate, and several skin patching materials are contained in the skin patching material bin; a skin patching spacer is arranged between two adjacent skin patching materials, and a first magnetic attraction member is arranged on the skin patching spacer; a skin patching spacer diversion recess is further provided in the movement member, a side of the first support plate is provided with a skin patching spacer magnetic frame, and the skin patching spacer magnetic frame and the first magnetic attraction member have opposite magnetism; and the skin patching spacer diversion recess is aligned with the skin patching material bin under the condition that the movement member is at the first station, and the skin patching spacer diversion recess is aligned with the skin patching spacer magnetic frame under the condition that the movement member is at the second station.

6. The skin manufacturing post-treatment device for the automobile collision dummy according to claim 1, wherein the cutting station comprises: a second support plate, a second lifting driving assembly is mounted on the second support plate, and a cutting assembly is mounted on a drive end of the second lifting driving assembly; the cutting assembly comprises a direct-acting sleeve, an end of the direct-acting sleeve is rotatably connected to an upper rotary ring, and an end of the upper rotary ring is rotatably connected to a lower rotary ring; an upper rotary ring servo motor is arranged on the direct-acting sleeve, a lower rotary ring servo motor is arranged on the upper rotary ring, and the upper rotary ring servo motor and the lower rotary ring servo motor are configured to drive the upper rotary ring and the lower rotary ring to rotate respectively; an outer wall of the upper rotary ring is further provided with a copper wire tensioning wheel and a copper wire inlet hole for a copper wire to enter and exit, an inner wall of the lower rotary ring is provided with a copper wire tractor and a copper wire heating body, and the copper wire heating body is configured to heat the copper wire; the copper wire forms cutting strings that have different sizes in an inner cavity of the lower rotary ring under the condition that the upper rotary ring is motionless and the lower rotary ring rotates, the cutting strings rotate to form an envelope circle, and the envelope circle is configured to cut the injection molding residual material; and a clamping assembly is arranged in the direct-acting sleeve, and the clamping assembly is configured to clamp the injection molding residual material.

7. The skin manufacturing post-treatment device for the automobile collision dummy according to claim 1, wherein the grinding station comprises: a third support plate; a third lifting driving assembly is arranged on the third support plate, and a support platform is mounted at a drive end of the third lifting driving assembly; and a grinding assembly motor is arranged on the support platform, and a rotary cutting head is arranged on a drive end of the grinding assembly motor.

8. The skin manufacturing post-treatment device for the automobile collision dummy according to claim 7, wherein a shell is arranged under the support platform, a detection assembly is arranged under the shell, the detection assembly comprises a coil spring connected to the shell, an end of the coil spring is connected to a support frame, a rotation space is formed in the support frame, and the rotary cutting head is located in the rotation space; an end, close to the coil spring, of the shell is provided with a displacement sensor, the displacement sensor is in signal connection to a controller, and the controller is in signal connection to the third lifting driving assembly and the grinding assembly motor; and the displacement sensor is configured to measure a stretching and retracting amount of the coil spring, and generate a stretching and retracting signal and send same to the controller, and the controller controls the third lifting driving assembly and the grinding assembly motor to be turned on and off according to the stretching and retracting signal.

9. The skin manufacturing post-treatment device for the automobile collision dummy according to claim 1, wherein the removal station comprises a fourth support plate, a fourth lifting driving assembly is arranged on the fourth support plate, and a working platform is mounted at a drive end of the fourth lifting driving assembly; an assembly rotation motor is arranged on the working platform, a removal assembly is mounted at a drive end of the assembly rotation motor, and the removal assembly comprises a trimming cutter head; and the trimming cutter head rotates around a second axis, and the second axis extends in a vertical direction.

10. The skin manufacturing post-treatment device for the automobile collision dummy according to claim 1, wherein the mounting position comprises a translational T-shaped table; a skin dismounting clamp is arranged on the translational T-shaped table, and the skin dismounting clamp comprises a support cover for supporting the dummy skin and a fixation assembly for fixing the dummy skin to the support cover; and at least two support assemblies are further arranged on the translational T-shaped table, and the support assemblies are configured to support the support cover.

* * * * *